US010891095B2

(12) United States Patent
Mori

(10) Patent No.: US 10,891,095 B2
(45) Date of Patent: Jan. 12, 2021

(54) IMAGE FORMING APPARATUS, PRINTING SYSTEM, AND JOB CONTROL METHOD

(71) Applicant: Keisuke Mori, Tokyo (JP)

(72) Inventor: Keisuke Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/445,770

(22) Filed: Jun. 19, 2019

(65) Prior Publication Data

US 2020/0026477 A1 Jan. 23, 2020

(30) Foreign Application Priority Data

Jul. 19, 2018 (JP) ................................. 2018-135960

(51) Int. Cl.
*G06F 3/12* (2006.01)
(52) U.S. Cl.
CPC .......... *G06F 3/1267* (2013.01); *G06F 3/1214* (2013.01); *G06F 3/1238* (2013.01); *G06F 3/1274* (2013.01); *G06F 3/1285* (2013.01)
(58) Field of Classification Search
None
See application file for complete search history.

(56) References Cited

U.S. PATENT DOCUMENTS

| 2007/0041042 A1* | 2/2007 | Tamai | H04N 1/32523 |
| | | | 358/1.15 |
| 2011/0317214 A1* | 12/2011 | Hamada | G06F 3/1288 |
| | | | 358/1.15 |
| 2014/0211238 A1* | 7/2014 | Nakajima | G06F 3/1291 |
| | | | 358/1.14 |
| 2015/0116756 A1 | 4/2015 | Mori | |
| 2015/0116764 A1 | 4/2015 | Mori | |
| 2015/0301772 A1* | 10/2015 | Nakajima | G06F 3/1267 |
| | | | 358/1.15 |
| 2015/0317551 A1 | 11/2015 | Mori | |
| 2016/0277631 A1 | 9/2016 | Mori | |
| 2017/0064115 A1* | 3/2017 | Hara | H04N 1/00891 |

(Continued)

FOREIGN PATENT DOCUMENTS

| JP | 2011-100352 | 5/2011 |
| JP | 2013-050757 | 3/2013 |
| JP | 2013-109645 | 6/2013 |

(Continued)

*Primary Examiner* — Frantz Bataille
(74) *Attorney, Agent, or Firm* — IPUSA, PLLC

(57) ABSTRACT

An image forming apparatus includes a first memory and one or more processors. The first memory stores a copy of information of at least a part of a print job transmitted from an information processing apparatus such that the copy of the information is associated with identification information of a user corresponding to the print job. The processors determine, in response to an operation performed by a logged-in user logged in to the image forming apparatus, whether the first memory stores a copy of information of at least a part of a print job associated with identification information of the logged-in user, acquire the copy of the information associated with the identification information of the logged-in user from the first memory based on a result of the determination, and display the acquired copy of the information on a display of the image forming apparatus.

14 Claims, 25 Drawing Sheets

(56) References Cited

U.S. PATENT DOCUMENTS

2017/0371598 A1 12/2017 Mori
2018/0032708 A1 2/2018 Mori et al.

FOREIGN PATENT DOCUMENTS

| | | |
|---|---|---|
| JP | 2014-149743 | 8/2014 |
| JP | 2014-225785 | 12/2014 |
| JP | 2015-088019 | 5/2015 |
| JP | 2015-088020 | 5/2015 |
| JP | 2016-048525 | 4/2016 |
| JP | 2016-177372 | 10/2016 |
| JP | 2016-177551 | 10/2016 |
| JP | 2017-167680 | 9/2017 |
| JP | 2018-005312 | 1/2018 |
| JP | 2018-077859 | 5/2018 |

\* cited by examiner

FIG. 5A

| COLUMN NAME | PARAMETER |
|---|---|
| DOCUMENT ID | id |
| USER NAME | user_name |
| JOB NAME | job_name |
| JOB STORAGE SOURCE | data_path |
| STORAGE LANGUAGE | printer_lang |
| NUMBER OF PAGES | pages |
| SIDE SETTING | duplex |
| COLOR INFORMATION | color |
| QUANTITY | copies |

FIG. 5B

| COLUMN NAME | PARAMETER EXAMPLE |
|---|---|
| DOCUMENT ID | 100 |
| USER NAME | User_A |
| JOB NAME | aaa.Txt |
| JOB STORAGE SOURCE | C:\data |
| STORAGE LANGUAGE | PCL |
| NUMBER OF PAGES | 10 |
| SIDE SETTING | 1(simplex), 2(duplex) |
| COLOR INFORMATION | 1(monochrome), 2(color) |
| QUANTITY | 5 |

FIG. 7A

| COLUMN NAME | PARAMETER |
|---|---|
| USER NAME | user_name |
| NUMBER OF JOBS | job_num |
| LATEST ACCESS TIME | latest_access_time |

FIG. 7B

| COLUMN NAME | PARAMETER EXAMPLE |
|---|---|
| USER NAME | User_A |
| NUMBER OF JOBS | 3 |
| LATEST ACCESS TIME | 2017/12/20 17:00 |

FIG. 8A

| COLUMN NAME | PARAMETER |
|---|---|
| DOCUMENT ID | id |
| USER NAME | user_name |
| JOB NAME | job_name |
| JOB STORAGE SOURCE | data_path |
| STORAGE LANGUAGE | printer_lang |
| NUMBER OF PAGES | pages |
| SIDE SETTING | duplex |
| COLOR INFORMATION | color |
| QUANTITY | copies |

FIG. 8B

| COLUMN NAME | PARAMETER EXAMPLE |
|---|---|
| DOCUMENT ID | 100 |
| USER NAME | User_A |
| JOB NAME | aaa.Txt |
| JOB STORAGE SOURCE | C:\data |
| STORAGE LANGUAGE | PCL |
| NUMBER OF PAGES | 10 |
| SIDE SETTING | 1(simplex), 2(duplex) |
| COLOR INFORMATION | 1(monochrome), 2(color) |
| QUANTITY | 5 |

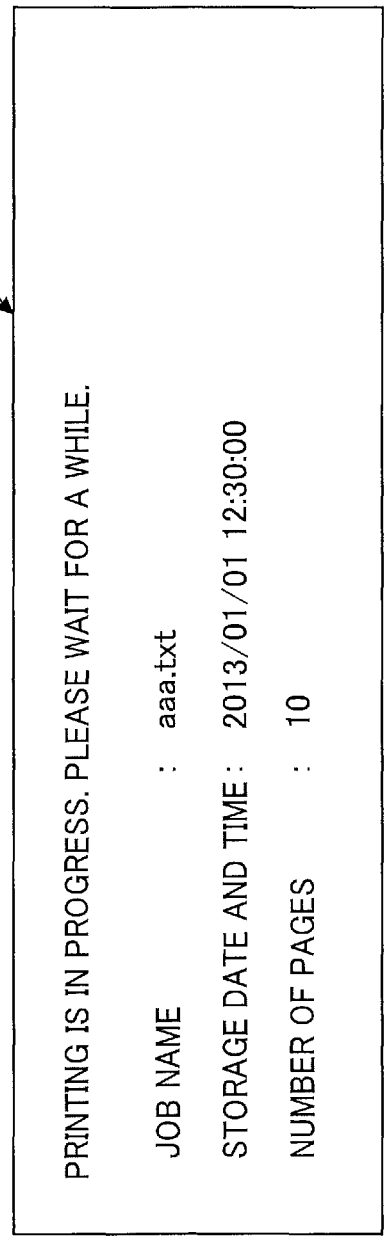
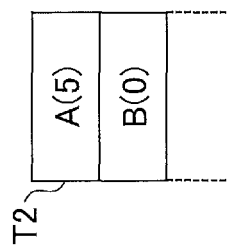

FIG. 15A
| USER | NUMBER OF JOBS | LATEST ACCESS TIME |
|---|---|---|
| A | 3 | 2017/12/20 17:00 |
| B | 2 | 2017/12/20 16:00 |
| C | 1 | 2017/12/20 15:00 |
FIG. 15B
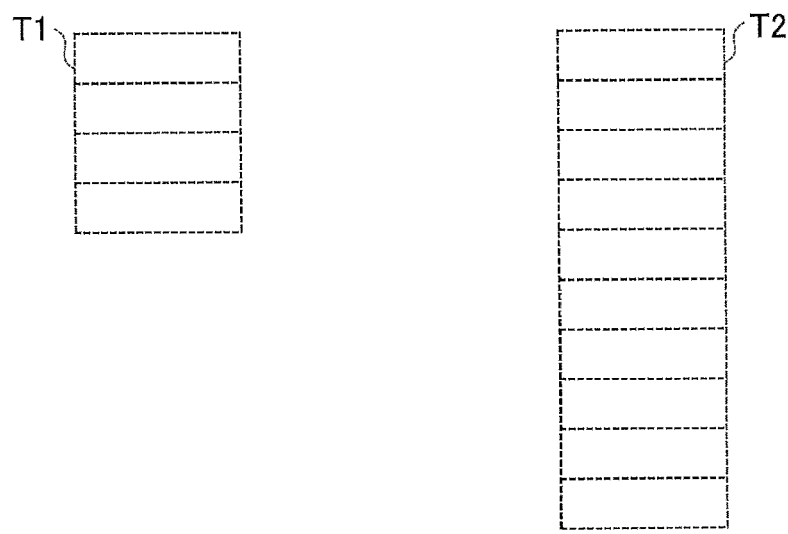
FIG. 15C
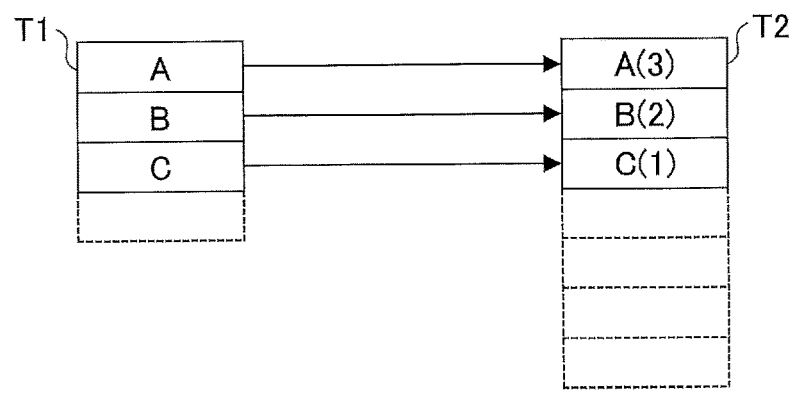

FIG. 16A
| USER | NUMBER OF JOBS | LATEST ACCESS TIME |
|------|----------------|--------------------|
| A | 3 | 2017/12/20 17:00 |
| B | 2 | 2017/12/20 16:00 |
| C | 1 | 2017/12/20 15:00 |
| D | 2 | 2017/12/20 14:00 |
| E | 3 | 2017/12/20 13:00 |
FIG. 16B
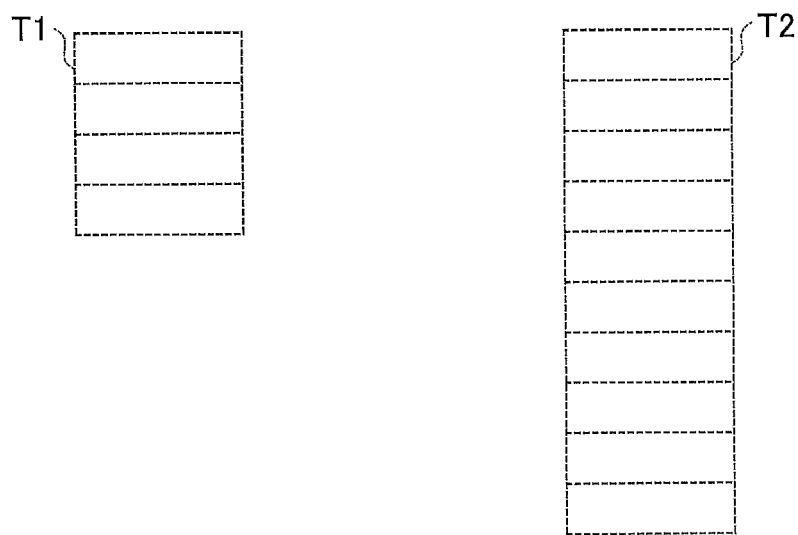
FIG. 16C
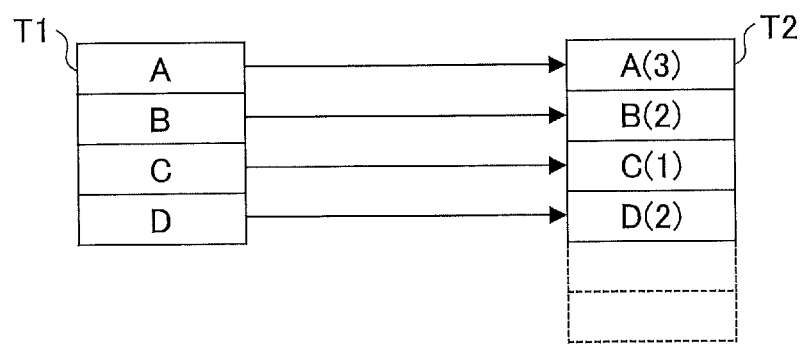

FIG. 17A
| USER | NUMBER OF JOBS | LATEST ACCESS TIME |
|---|---|---|
| A | 5 | 2017/12/20 17:00 |
| B | 2 | 2017/12/20 16:00 |
| C | 5 | 2017/12/20 15:00 |
| D | 1 | 2017/12/20 14:00 |
FIG. 17B
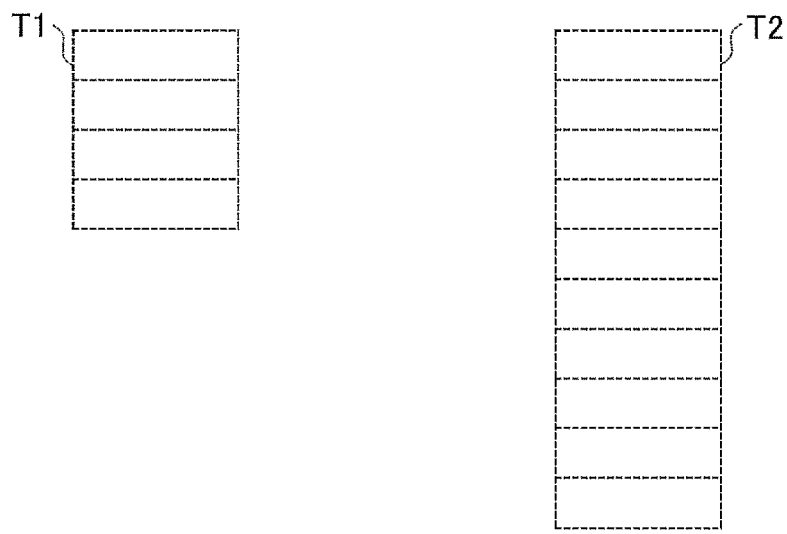
FIG. 17C
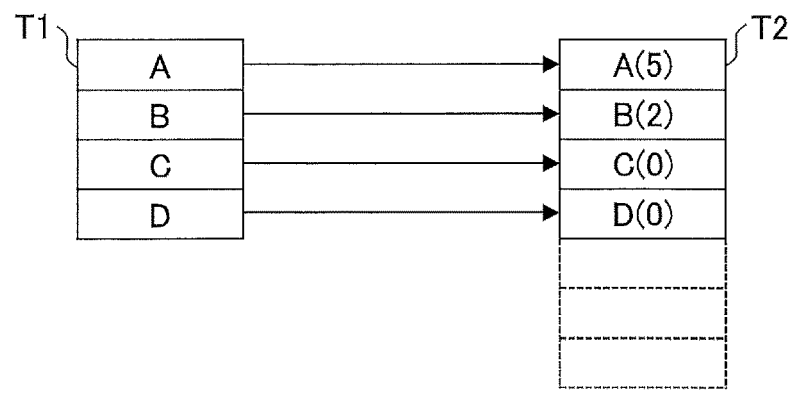

FIG. 20A
| USER | NUMBER OF JOBS | LATEST ACCESS TIME |
|------|----------------|--------------------|
| A | 3 | 2017/12/20 17:00 |
| B | 2 | 2017/12/20 16:00 |
| C | 1 | 2017/12/20 15:00 |
| D | 2 | 2017/12/20 14:00 |
USER E STORES PRINT JOB
| USER | NUMBER OF JOBS | LATEST ACCESS TIME |
|------|----------------|--------------------|
| A | 3 | 2017/12/20 17:00 |
| B | 2 | 2017/12/20 16:00 |
| C | 1 | 2017/12/20 15:00 |
| D | 2 | 2017/12/20 14:00 |
| E | 1 | 2017/12/21 10:00 |
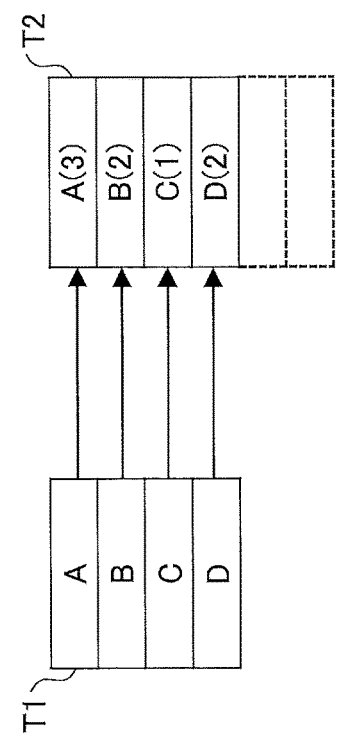
FIG. 20B
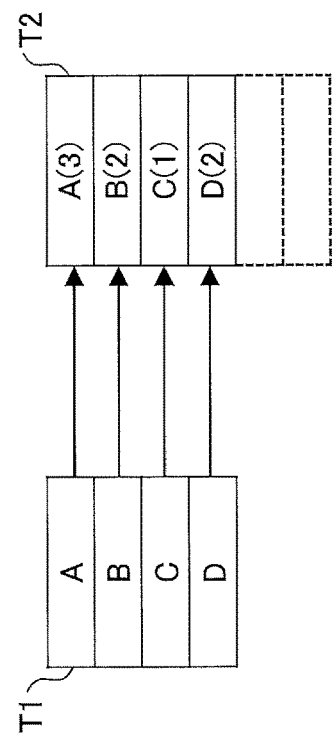
FIG. 20C FIG. 22A
| USER | NUMBER OF JOBS | LATEST ACCESS TIME |
|---|---|---|
| A | 5 | 2017/12/20 17:00 |
| B | 2 | 2017/12/20 16:00 |
| C | 3 | 2017/12/20 15:00 |
| D | 4 | 2017/12/20 14:00 |
⇧ USER D STORES PRINT JOB
| USER | NUMBER OF JOBS | LATEST ACCESS TIME |
|---|---|---|
| A | 5 | 2017/12/20 17:00 |
| B | 2 | 2017/12/20 16:00 |
| C | 3 | 2017/12/20 15:00 |
| D | 5 | 2017/12/21 10:00 |
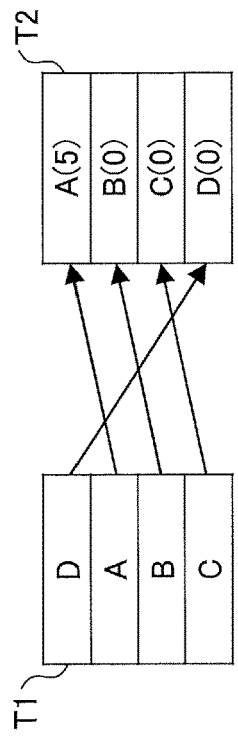
FIG. 22B
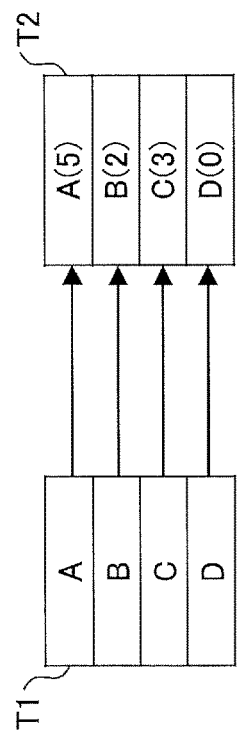
FIG. 22C
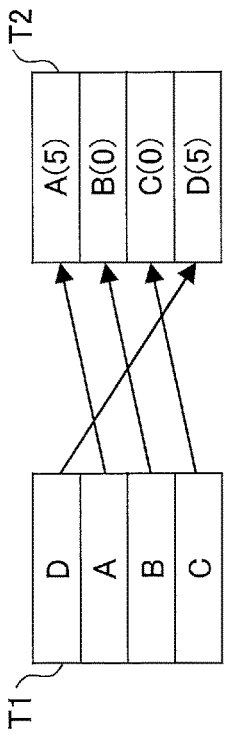
FIG. 22D

USER D DELETES PRINT JOB

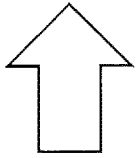
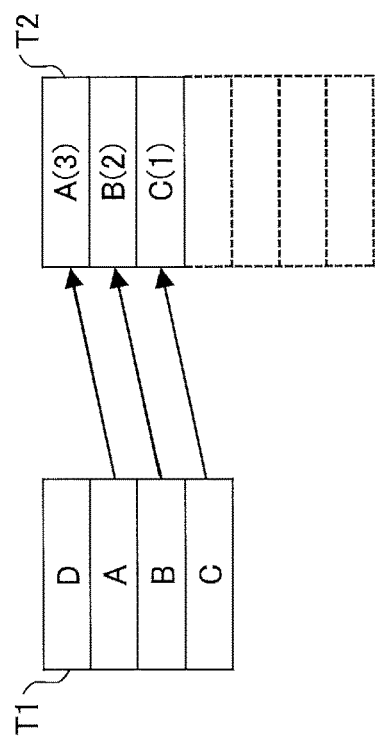
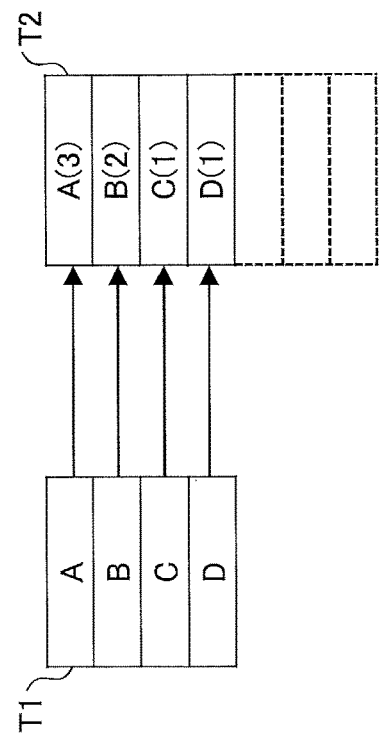

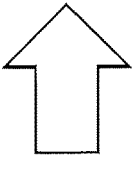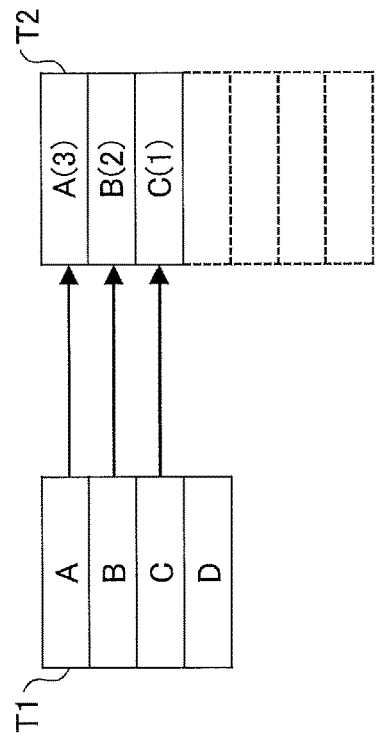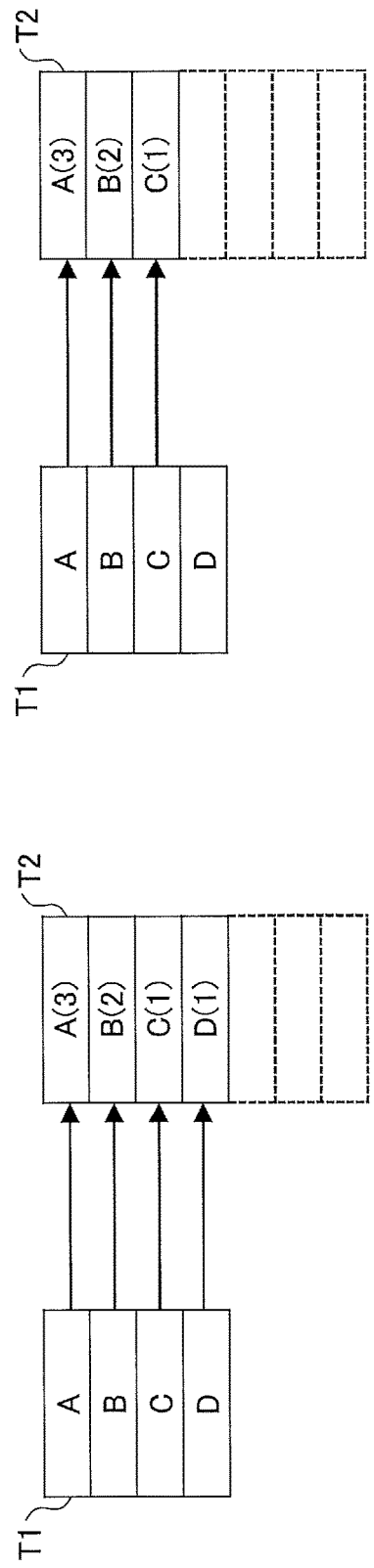

IMAGE FORMING APPARATUS, PRINTING SYSTEM, AND JOB CONTROL METHOD

CROSS-REFERENCE TO RELATED APPLICATION

This patent application is based on and claims priority pursuant to 35 U.S.C. § 119(a) to Japanese Patent Application No. 2018-135960 filed on Jul. 19, 2018, in the Japan Patent Office, the entire disclosure of which is hereby incorporated by reference herein.

BACKGROUND

Technical Field

The present invention relates to an image forming apparatus, a printing system, and a job control method.

Description of the Related Art

According to an existing technique, a print job transmitted to an image forming apparatus from a client personal computer (PC) is stored in a hard disk drive (HDD) of the image forming apparatus, and the stored print job is executed by a user. In printing of the print job, the user inputs his or her identification information to the image forming apparatus to display a job list of print jobs on a display of the image forming apparatus, and selects the print job from the job list of print jobs, and executes the printing of the print job.

This technique reduces work of the user such as inputting a frequently used print job to the image forming apparatus from the client PC in each printing of the print job, for example.

According to the existing technique, however, it takes time in some cases to display a print job stored in the image forming apparatus on the display.

SUMMARY

In one embodiment of this invention, there is provided an improved image forming apparatus that includes, for example, a first memory and one or more processors. The first memory stores a copy of information of at least a part of a print job transmitted from an information processing apparatus such that the copy of the information of at least the part of the print job is associated with identification information of a user corresponding to the print job. The one or more processors determine, in response to an operation performed by a logged-in user logged in to the image forming apparatus, whether the first memory stores a copy of information of at least a part of a print job associated with identification information of the logged-in user logged in to the image forming apparatus, acquire, based on a result of the determination, the copy of the information of at least the part of the print job associated with the identification information of the logged-in user from the first memory, and display the acquired copy of the information of at least the part of the print job on a display of the image forming apparatus.

In one embodiment of this invention, there is provided an improved printing system that includes, for example, a print server that stores a print job and the above-described image forming apparatus that executes the print job.

In one embodiment of this invention, there is provided an improved job control method executed by an image forming apparatus. The job control method includes, for example: storing a copy of information of at least a part of a print job transmitted from an information processing apparatus into a first memory, with the copy of the information of at least the part of the print job being associated with identification information of a user corresponding to the print job; determining, in response to an operation performed by a logged-in user logged in to the image forming apparatus, whether the first memory stores a copy of information of at least a part of a print job associated with identification information of the logged-in user logged in to the image forming apparatus; acquiring, based on a result of the determination, the copy of the information of at least the part of the print job associated with the identification information of the logged-in user from the first memory; and displaying the acquired copy of the information of at least the part of the print job on a display of the image forming apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A and 5B are diagrams illustrating, in a table, exemplary information included in the print job according to the embodiment;

FIGS. 7A and 7B are diagrams illustrating an exemplary user cache table and exemplary stored user cache according to the embodiment;

FIGS. 8A and 8B are diagrams illustrating an exemplary job cache table and exemplary stored job cache according to the embodiment;

FIG. 13 is a diagram illustrating an exemplary in-progress screen according to the embodiment displayed on the operation panel during the execution of the print job;

FIGS. 14A and 14B are diagrams illustrating exemplary respective states of the user cache table and the job cache table according to the embodiment;

FIGS. 15A to 15C are diagrams illustrating an exemplary job storage state and exemplary respective states of the user cache table and the job cache table according to the embodiment when print jobs in an HDD of the image forming apparatus are within the upper limits of the user cache table and the job cache table in initial launch of an application;

FIGS. 16A to 16C are diagrams illustrating an exemplary job storage state and exemplary respective states of the user cache table and the job cache table according to the embodiment when the print jobs in the HDD exceed the upper limit of the user cache table in the initial launch of the application;

FIGS. 17A to 17C are diagrams illustrating an exemplary job storage state and exemplary respective states of the user cache table and the job cache table according to the embodiment when the print jobs in the HDD exceed the upper limit of the job cache table in the initial launch of the application;

FIGS. 20A to 20C are diagrams illustrating an exemplary job storage state and exemplary respective states of the user cache table and the job cache table according to the embodiment when a print job is added by a new user in a state in which the user cache table has reached the upper limit thereof;

FIGS. 22A to 22D are diagrams illustrating an exemplary job storage state and exemplary respective states of the user cache table and the job cache table according to the embodiment when a print job is added by an existing user in a state in which the job cache table has reached the upper limit thereof;

FIGS. 25A to 25C are diagrams illustrating an exemplary job storage state and exemplary respective states of the user cache table and the job cache table according to the embodiment when a print job is deleted and the number of print jobs is reset to zero by a deleting operation by a user or by settings for deleting a print job after printing; and FIGS. 26A to 26C are diagrams illustrating an exemplary job storage state and exemplary respective states of the user cache table and the job cache table according to the embodiment when a print job is deleted and the number of print jobs is reset to zero by job deletion by the scheduled process or the management tool.

Figure 1A:
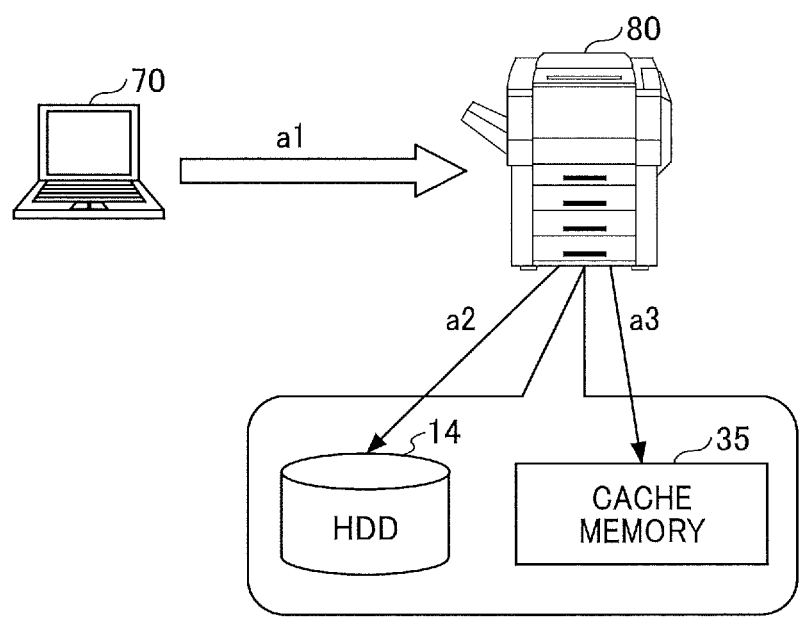
FIGS. 1A and 1B are diagrams illustrating an exemplary overview of an operation in which an image forming apparatus according to an embodiment of the present invention performs printing of a print job stored therein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

An overview of an operation of the embodiment will be described.

Figure 1B:
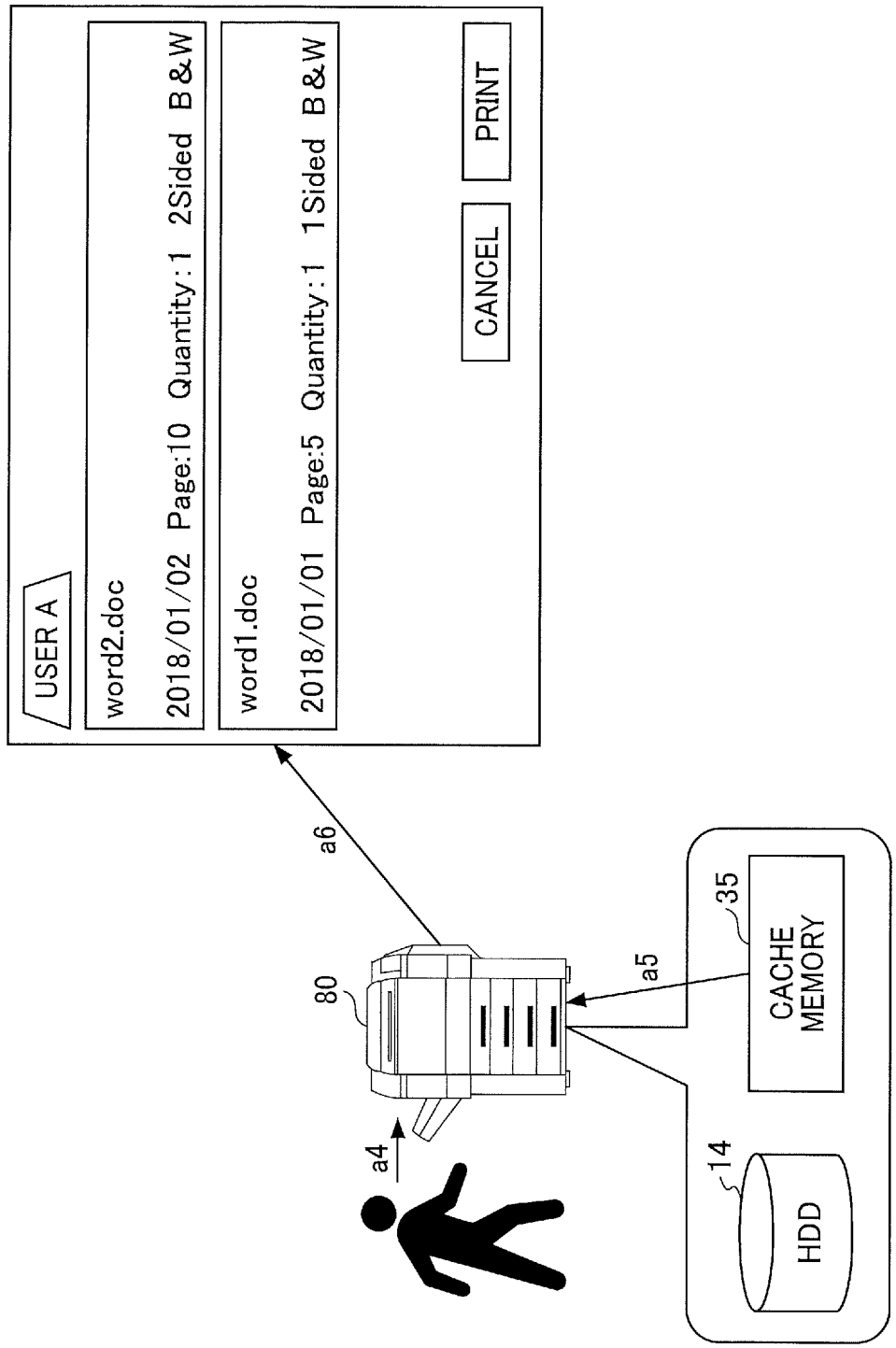

FIGS. 1A and 1B are diagrams illustrating an exemplary overview of an operation in which an image forming apparatus according to the embodiment performs printing of a print job stored therein.

FIG. 1A illustrates a print job input process. A user operates a client PC 70 to input a print job to an image forming apparatus 80, as indicated by arrow a1. The image forming apparatus 80 stores the print job in an HDD 14, as indicated by arrow a2, similarly as in an existing image forming apparatus. The image forming apparatus 80 further stores a job cache of the print job in a cache memory 35, as indicated by arrow a3. The job cache of the print job is bibliographic information of the print job, for example. The cache memory 35 is a storage device accessible separately from the HDD 14, such as a random access memory (RAM), for example.

FIG. 1B illustrates a print job execution process. When the image forming apparatus 80 is in an energy saving mode, for example, the user presses a button of the image forming apparatus 80 to cause the image forming apparatus 80 to return from the energy saving state or to display a job list of print jobs in the energy saving mode. The user logs in to the image forming apparatus 80, and performs an operation of displaying a job list including the print job input by the user, as indicated by arrow a4. The image forming apparatus 80 receives the operation of displaying the job list, and determines whether the job cache of the print job of the user is stored in the cache memory 35. If the job cache is stored in the cache memory 35, the image forming apparatus 80 acquires the job cache from the cache memory 35, as indicated by arrow a5. The cache memory 35 is accessible immediately after the return of the image forming apparatus 80 from the energy saving mode. Based on the job cache, the image forming apparatus 80 displays the job list on an operation panel, as indicated by arrow a6. The operation panel is an example of a display.

The image forming apparatus 80 of the embodiment thus creates the job cache in the cache memory 35 during the storage of the print job, enabling display of the job list on the operation panel even when the HDD 14 is inaccessible. The HDD 14 normally becomes accessible while the user is selecting the print job from the job list. Even if the HDD 14 is still inaccessible when the user has finished selecting the print job, the waiting time for access to the HDD 14 is shorter than the waiting time for completion of printing. Therefore, the user is unlikely to notice that the HDD 14 is still in the boost phase.

In the following description, a copy of information of at least a part of a print job refers to a part or all of information extractable from the print job, and is a copy separate from the print job. In the embodiment, the term "job cache" refers to a copy of information of at least a part of a print job.

A first memory temporarily stores a copy of information of at least a part of a print job. In the embodiment, the cache memory 35 is used as the first memory.

A second memory stores a print job. In the embodiment, the HDD 14 or a later-described print job information database (DB) 49 is used as the second memory.

An information processing apparatus is an apparatus that stores a print job transmitted to the image forming apparatus 80. In the embodiment, each of the client PC 70 and a later-described print server 30 is an information processing apparatus.

A cache refers to temporarily storing data in a storage device accessible in a short time or data temporarily stored in such a storage device to speed up access to data. The original data is stored separately from the cached data, which is a copy of the original data.

An exemplary system configuration of a printing system according to the embodiment will be described.

Figure 2:
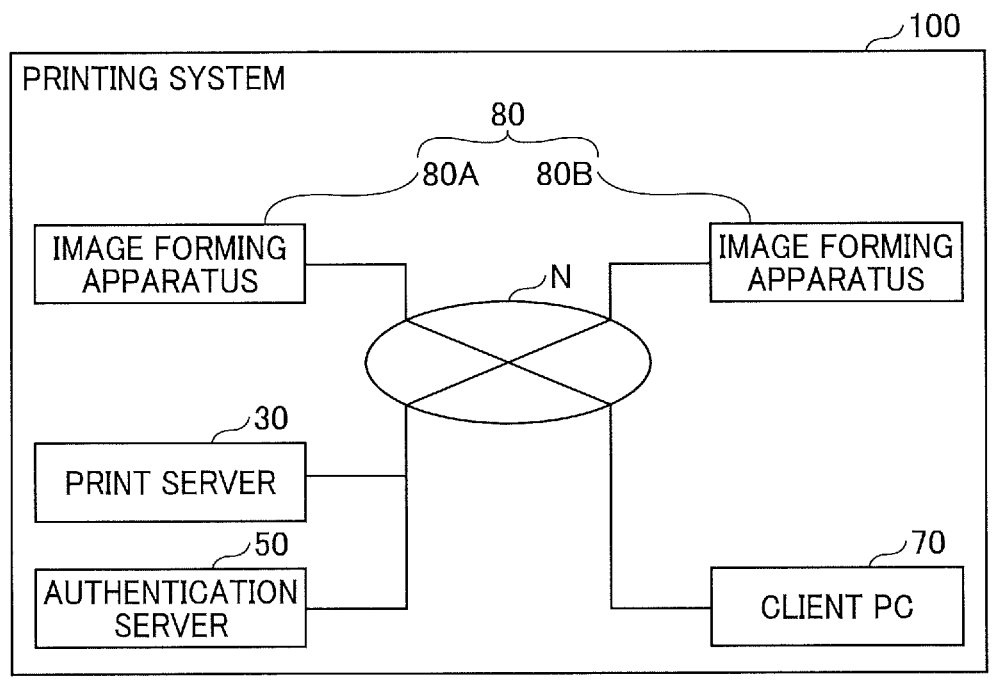
FIG. 2 is a diagram illustrating an exemplary system configuration of a printing system according to the embodiment.

FIG. 2 is a diagram illustrating an exemplary system configuration of a printing system 100 according to the embodiment. The printing system 100 includes image forming apparatuses 80A and 80B, the print server 30, an authentication server 50, and the client PC 70, which are capable of communicating with each other via a network N. Hereinafter, the image forming apparatus 80A or 80B will be described as the image forming apparatus 80 where distinction therebetween is unnecessary.

The network N is assumed to be a commonly used network such as a local area network (LAN) or the Internet. For example, the LAN may be built in a setting such as an office in which the image forming apparatuses 80 and the client PC 70 are installed. The network N may include a wide area Ethernet (registered trademark) or a wide area network (WAN) including a plurality of LANs. A part or all of the network N may be wirelessly configured. Such a wireless network may include a wireless LAN, a worldwide interoperability for microwave access (WiMax) network, and mobile telephone networks such as third generation (3G), fourth generation (4G), and fifth generation (5G).

The image forming apparatus 80 is an apparatus with an image forming function. For example, the image forming apparatus 80 may be referred to as a printer or printing apparatus having the image forming function as a major function thereof. Alternatively, the image forming apparatus 80 may be a multifunction peripheral (MFP) with functions such as a printer function, a copier function, a facsimile function, and a scanner function. Further, the image forming apparatus 80 may be referred to as a copier or copying apparatus.

It is assumed here that the image forming apparatuses 80A and 80B are the same in function, and that, even if the image forming apparatuses 80A and 80B are different in function, the difference is negligible in the description of the embodiment. The image forming apparatus 80A is capable of acquiring a print job stored in the image forming apparatus 80B and performing printing of the acquired print job. Similarly, the image forming apparatus 80B is capable of acquiring a print job stored in the image forming apparatus 80A and performing printing of the acquired print job. Specifically, in the embodiment, the image forming apparatus 80A is capable of acquiring a print job stored in the HDD 14 of the image forming apparatus 80B and performing printing of the acquired print job, and the image forming apparatus 80B is capable of acquiring a print job stored in the HDD 14 of the image forming apparatus 80A and performing printing of the acquired print job.

The client PC 70 is an information processing apparatus operated by a user to register (i.e., input) a print job in the image forming apparatus 80. The client PC 70 stores document data created by application software running on the client PC 70. On the client PC 70, a printer driver converts the document data into a print job (i.e., print data described in the page description language (PDL) and print settings), and transmits the print job to the image forming apparatus 80.

The client PC 70 may be a commonly used PC, a tablet terminal, a smartphone, a personal digital assistant (PDA), a mobile phone, or a wearable computer, for example. The client PC 70 may be any device or apparatus on which the printer driver operates. The client PC 70 may also be a video conference terminal, an electronic whiteboard, a projector, a vehicle navigation terminal, a camera, or a game machine, for example.

The print server 30 is an information processing apparatus serving as a server apparatus with a function of storing a print job on behalf of the image forming apparatus 80. The print server 30 is used when, for example, which one of the image forming apparatuses 80 is to be used for printing a print job is not determined yet at the time of storing the print job. Printing via the print server 30 is called pull printing. In the embodiment, the image forming apparatus 80 is capable of creating the job cache of the print job stored in the print server 30.

The authentication server 50 is an information processing apparatus serving as a server apparatus that performs user authentication. The image forming apparatus 80 transmits authentication information (e.g., a user identification (ID) and a password) input by the user to the authentication server 50, and acquires an authentication result from the authentication server 50. Based on the authentication result, the image forming apparatus 80 allows or limits login of the user. If the image forming apparatus 80 has the function of the authentication server 50, the authentication server 50 is unnecessary.

An example of the authentication server 50 is a lightweight directory access protocol (LDAP) server. The LDAP is a protocol for connecting to a directory service that manages information of network devices and users. The directory service is a service that integrally manages a variety of information available on a network and provides functions such as a search function. Software for the LDAP server includes open software such as OpenLDAP and commercial software represented by Active Directory (registered trademark) of Microsoft Corp.

An exemplary hardware configuration of the image forming apparatus 80 in the printing system 100 of the embodiment will now be described.

Figure 3:
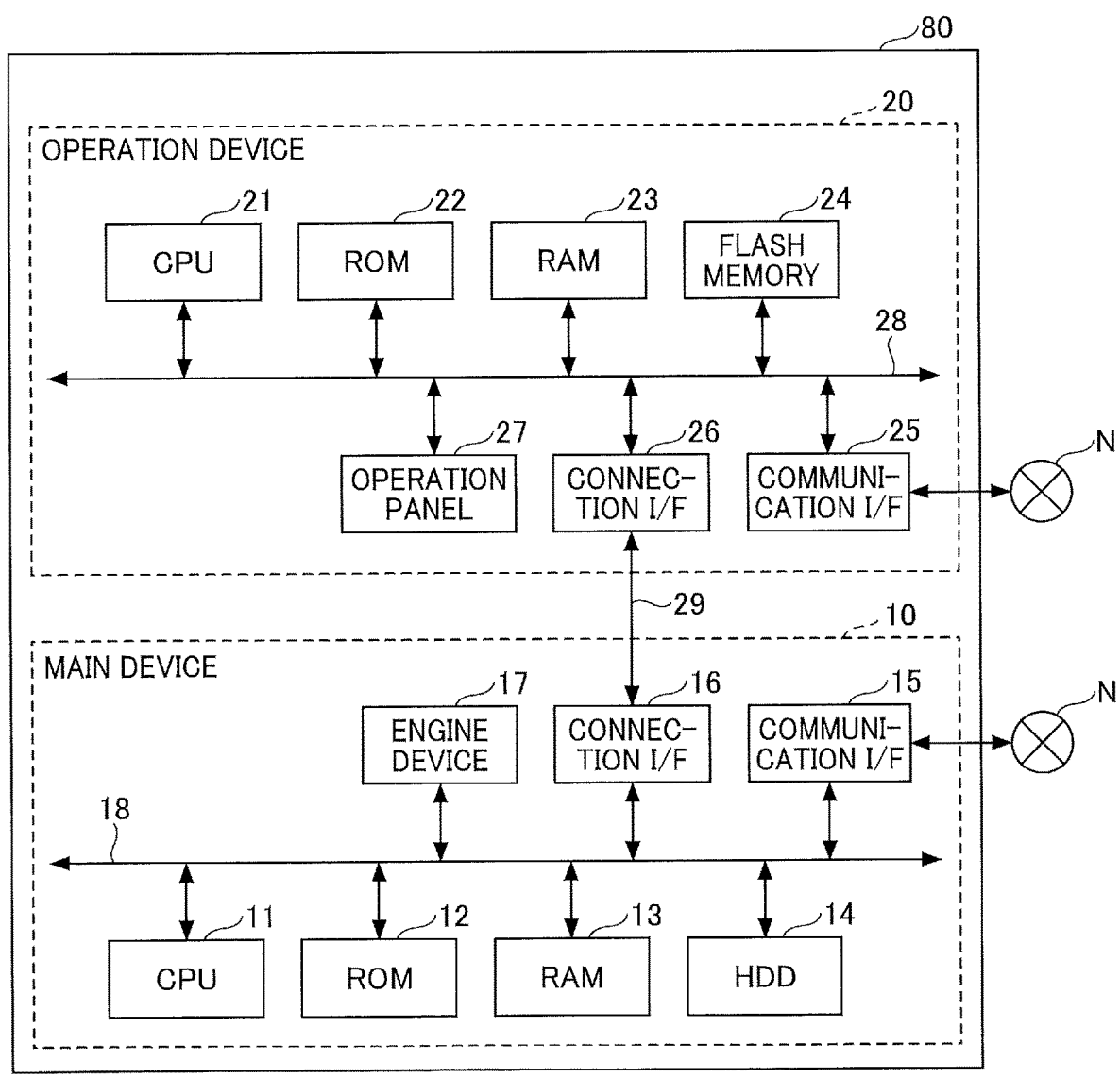
FIG. 3 is a diagram illustrating an exemplary hardware configuration of the image forming apparatus according to the embodiment.

FIG. 3 is a diagram illustrating an exemplary hardware configuration of the image forming apparatus 80. As illustrated in FIG. 3, the image forming apparatus 80 includes a main device 10 and an operation device 20, which are connected via a dedicated communication path 29 to be able to communicate with each other. The communication path 29 may comply with the universal serial bus (USB) standard, for example, or may comply with a desired standard regardless of whether the communication path 29 is for wired communication or for wireless communication.

The main device 10 operates in response to an operation received by the operation device 20. The main device 10, which is capable of communicating with an external apparatus such as the client PC 70, also operates in response to an instruction received from the external apparatus.

A hardware configuration of the main device 10 will be described.

As illustrated in FIG. 3, the main device 10 includes a central processing unit (CPU) 11, a read only memory (ROM) 12, a random access memory (RAM) 13, the HDD 14, a communication interface (I/F) 15, a connection I/F 16, and an engine device 17, which are connected to each other via a system bus 18.

The CPU 11 performs overall control of the operation of the main device 10. Using the RAM 13 as a work area, the CPU 11 executes programs stored in the ROM 12 or the HDD 14, for example. Thereby, the CPU 11 controls the operation of the entire main device 10, implementing various functions such as the copier function, the scanner function, the facsimile function, and the printer function.

The communication I/F 15 is an interface for connection to the network N. The connection I/F 16 is an interface for communication with the operation device 20 via the communication path 29.

The engine device 17 is hardware that performs processes for implementing the copier function, the scanner function, the facsimile function, and the printer function other than general-purpose information processing and communication. For example, the engine device 17 includes a scanner that scans and reads the image of a document, a plotter (i.e., an image forming device) that performs printing on a sheet material such as paper, and a facsimile device that performs facsimile communication. The engine device 17 may further include a finisher that sorts printed sheet materials and a specific optional device such as an automatic document feeder (ADF) that automatically feeds documents.

A hardware configuration of the operation device 20 will be described.

As illustrated in FIG. 3, the operation device 20 includes a CPU 21, a ROM 22, a RAM 23, a flash memory 24, a communication I/F 25, a connection I/F 26, and an operation panel 27, which are connected to each other via a system bus 28. For convenience of description, FIG. 3 illustrates an example in which the operation device 20 includes the flash memory 24. The operation device 20, however, may be configured without the flash memory 24, for example.

In the configuration illustrated in FIG. 3, the print job is stored in the HDD 14 of the main device 10. The job cache is stored in at least one of the RAM 23 and the flash memory 24. The following description of the embodiment will be given on the assumption that the job cache is stored in the RAM 23. The RAM 23 is a volatile memory that loses stored information once power supply thereto is cut off, while the HDD 14 is a non-volatile memory that retains stored information even after power supply thereto is cut off.

The operation device 20 is capable of receiving a user operation even in the energy saving mode, in which the engine device 17 and the HDD 14 of the main device 10 are stopped. Alternatively, when the operation device 20 and the main device 10 are both in the energy saving mode, the operation device 20 returns from the energy saving state faster than the main device 10. It is therefore effective to generate the job cache in the operation device 20.

Functions of the image forming apparatus 80 will be described with FIG. 4.

Figure 4:
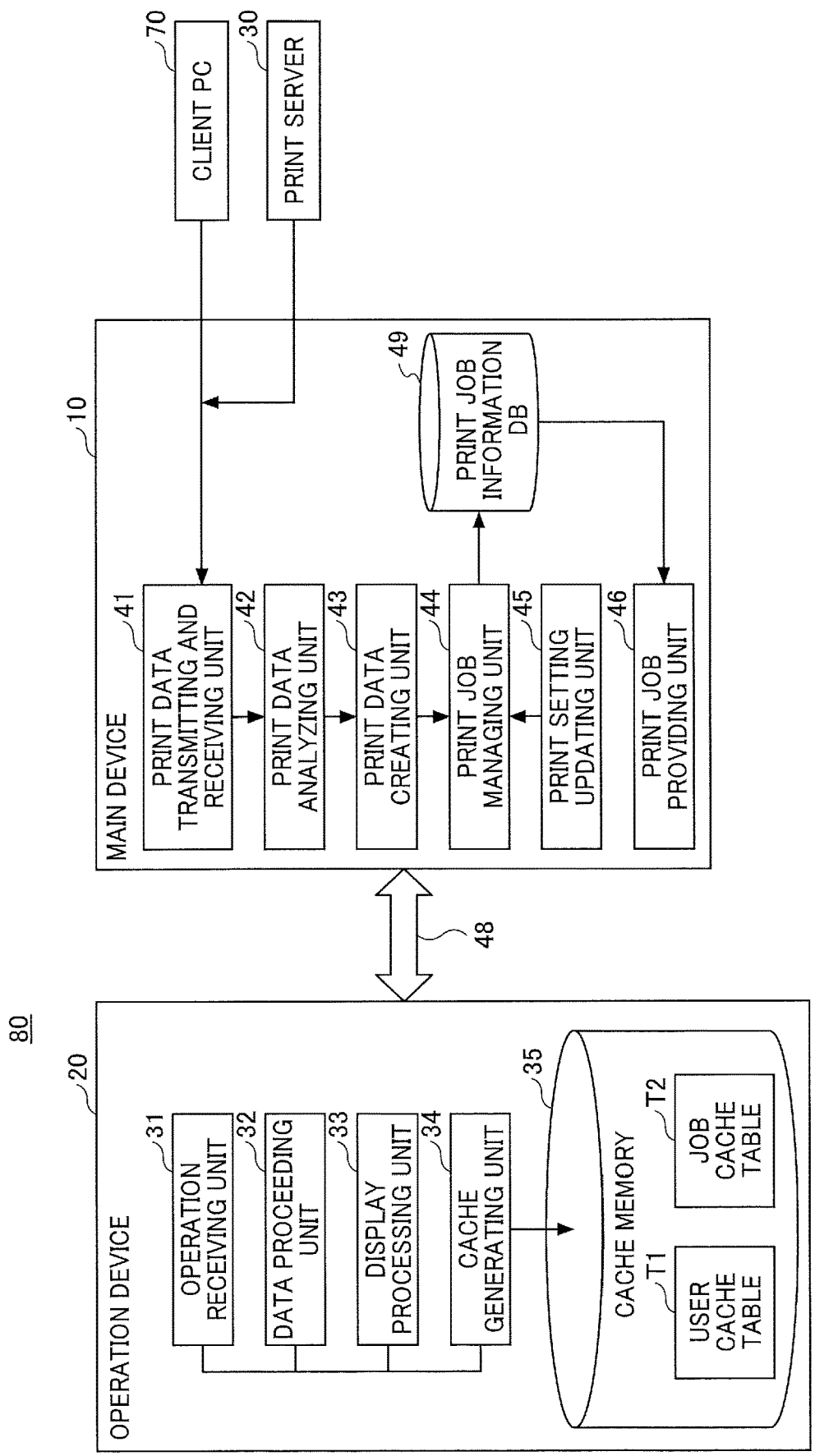
FIG. 4 is a functional block diagram illustrating, in blocks, exemplary functions of the image forming apparatus according to the embodiment.

FIG. 4 is a functional block diagram illustrating, in blocks, exemplary functions of the image forming apparatus 80.

The operation device 20 includes an operation receiving unit 31, a data processing unit 32, a display processing unit 33, and a cache generating unit 34. Each of these functional units of the operation device 20 is a function or device implemented when one of the component elements illustrated in FIG. 3 operates in response to a command from the CPU 21 in accordance with a program deployed in the RAM 23 from the flash memory 24. The program is distributed from a program distribution server or as stored in a storage medium.

The operation receiving unit 31 receives a variety of user operations and inputs to the operation device 20 of the image forming apparatus 80. For example, the operation receiving unit 31 receives input of the authentication information and selection of a print job.

The data processing unit 32 acquires a job cache from the cache memory 35. If the job cache is not stored in the cache memory 35, the data processing unit 32 acquires the print job from the main device 10.

The display processing unit 33 displays the job cache or the bibliographic information of the print job acquired by the data processing unit 32 on the operation panel 27. For example, the display processing unit 33 displays the job list of print jobs.

The cache generating unit 34 stores a job cache and a user cache in the cache memory 35. The user cache is stored in a user cache table T1, and the job cache is stored in a job cache table T2. The user cache refers to information of the user corresponding to the job cache stored in the job cache table T2, such as the user name (i.e., identification information), the number of jobs, and the latest access time, as illustrated in FIGS. 7A and 7B. The job cache refers to the bibliographic information of the print job, as illustrated in FIGS. 8A and 8B.

The cache memory 35 is built in at least one of the RAM 23 and the flash memory 24 of the operation device 20 (the RAM 23 in the present example) to store a copy of a part or all of the print job.

The main device 10 includes a print data transmitting and receiving unit 41, a print data analyzing unit 42, a print data creating unit 43, a print job managing unit 44, a print setting updating unit 45, and a print job providing unit 46. Each of these functional units of the main device 10 is a function or device implemented when one of the component elements illustrated in FIG. 3 operates in response to a command from the CPU 11 in accordance with a program deployed in the RAM 13 from the HDD 14. The program is distributed from a program distribution server or as stored in a storage medium.

The main device 10 further includes the print job information DB 49 built in the HDD 14 illustrated in FIG. 3. The print job information DB 49, which stores print jobs, will be described later with FIGS. 5A and 5B.

The print data transmitting and receiving unit 41 receives a print job transmitted from the client PC 70 or the print server 30. The print data analyzing unit 42 analyzes the print job, and divides the print job into the print data and the print settings. The print data analyzing unit 42 further analyzes the PDL of the print data.

The print data creating unit 43 performs rendering based on the print data to generate an image to be actually printed. The print job managing unit 44 stores the print settings (e.g., the number of prints and the print side) in the print job information DB 49 by associating the print settings with the image generated from the print data.

If the print settings are changed by the user, the print setting updating unit 45 updates the print settings in the print job information DB 49. Then, the print job managing unit 44 stores the updated print job in the print job information DB 49.

The stored print job is provided to the engine device 17, which then forms an image on a sheet based on the print settings.

In response to a request from the operation device 20 for a print job with specification of the corresponding user name, the print job providing unit 46 searches through the print job information DB 49 for the print job associated with the user name, and acquires and transmits the print job to the operation device 20. The print job providing unit 46 may transmit all of the print job or a part of the print job (i.e., the bibliographic information). The operation device 20 and the main device 10 are connected via an information transmitting and receiving passage 48, which is implemented by the foregoing communication path 29.

Information included in the print job will be described with FIGS. 5A and 5B.

FIGS. 5A and 5B are diagrams illustrating, in a table, exemplary information included in the print job. The information illustrated in FIGS. 5A and 5B is associated with the image generated from the print data or with the print data, although the illustration of the image data or the print data is omitted in FIGS. 5A and 5B. FIG. 5A illustrates parameters representing items, and FIG. 5B illustrates an example of actual values of the parameters. Information such as that illustrated in FIG. 5B is referred to as the bibliographic information.

Each print job includes a document ID for uniquely identifying the print job, a user name of the user who has stored the print job (corresponding to the identification information of the user), and a job name of the stored print job (e.g., a file name) Herein, ID as an abbreviation of "identification" refers to an identifier or identification information, and is a name, a sign, a character string, a numeric value, or a combination of at least two thereof used to uniquely identify a specific one of a plurality of objects.

The print job further includes a job storage source representing the location of a file of the print job, a storage language representing the PDL used in the storage process by the user, the number of pages representing the number of pages of the print job, side setting representing the number of sides (i.e., surfaces) to be printed in the print job, color information representing color information of the print job, and the quantity of the print job.

When the user performs the storage process on the image faulting apparatus 80, the print data analyzing unit 42 reads the items of FIGS. 5A and 5B from the print job, and stores the read items in the print job information DB 49.

An operation procedure of a user authentication operation will now be described with FIG. 6.

Figure 6:
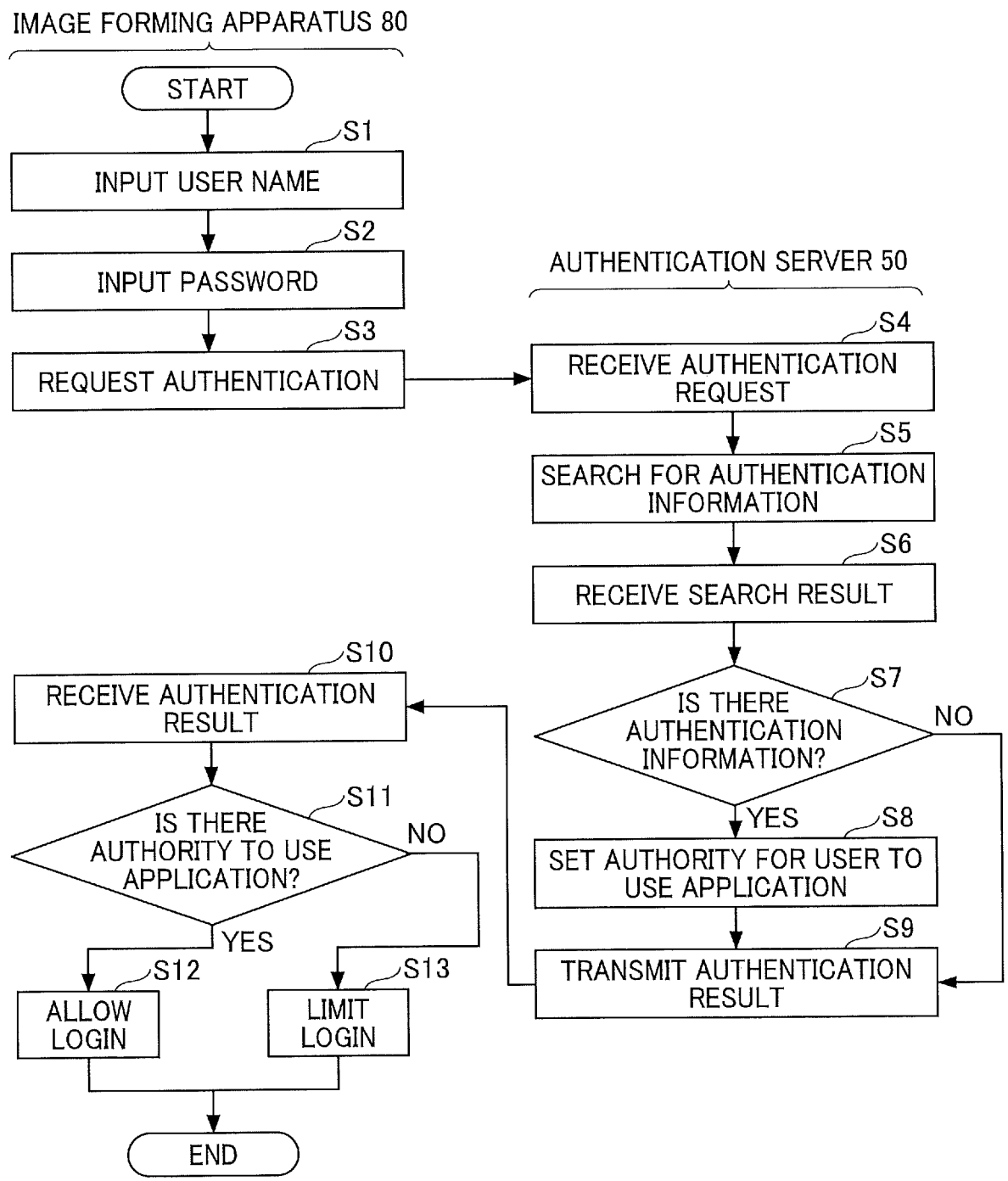
FIG. 6 is a flowchart illustrating an exemplary login operation performed by a user on the image forming apparatus according to the embodiment.

FIG. 6 is a flowchart illustrating an exemplary login operation performed on the image forming apparatus 80 by the user.

The operation panel 27 of the image forming apparatus 80 constantly displays a login screen, or displays the login screen in response to a user operation such as touching the operation panel 27 of the image forming apparatus 80.

The user inputs the authentication information (e.g., the user name and the password) (steps S1 and S2), and the operation receiving unit 31 receives the authentication information.

The operation receiving unit 31 transmits the authentication information to the authentication server 50 to request authentication (step S3).

The authentication server 50 receives the authentication information and the authentication request (step S4). The authentication server 50 searches through an active directory for the authentication information (step S5), and acquires a search result (step S6).

If the authentication information is stored in the active directory (YES at step S7), the authentication server 50 sets use authority for the user to use application software (step S8). The use authority to use the application software corresponds to identification information of the application software according to the authority of the user, for example. That is, the logged-in user is given the use authority to use the application software available to the user. For example, application software that an administrator is authorized to use is different from application software that a general user is authorized to use.

If the authentication information is not stored in the active directory (NO at step S7), the authentication server 50 determines an authorization failure. The authentication server 50 then transmits an authentication result (i.e., the use authority for the user to use the application software or the authentication failure) to the image forming apparatus 80 (step S9). In the embodiment, the application software that the user is authorized to use includes application software for executing printing of a stored print job.

The image forming apparatus 80 receives the authentication result (step S10). If the authentication result includes the use authority for the user to use the application software (YES at step S11), the image Ruining apparatus 80 allows login of the user to the application software (step S12). Thereby, the user is allowed to use the application software (i.e., function), the use authority of which is set for the user.

If the authentication result does not include the use authority for the user to use the application software (NO at step S11), the image forming apparatus 80 limits login of the user to the application software (step S13). That is, the user is not allowed to use the application software (i.e., function). Consequently, the user is unable to use the image forming apparatus 80 except for a basic function such as login to the image forming apparatus 80.

The above-described login may also be performed with information registered in an integrated circuit (IC) card, which is held over the image forming apparatus 80. If the information in the IC card held over the image forming apparatus 80 is not registered yet, user registration may be performed on the image forming apparatus 80. Further, the login may be performed without the authentication server 50 and based on information in an address book stored in the image forming apparatus 80.

The generation of the job cache and the user cache during the storage of the print job will be described with FIGS. 7A to 9.

FIGS. 7A and 7B illustrate an example of the user cache table T1 and the user cache stored therein. FIG. 7A illustrates parameter names in the user cache table T1, and FIG. 7B illustrates an example of actual values of parameters, i.e., an example of the user cache.

The user cache table T1 includes items: the user name, the number of jobs, and the latest access time. The user name (i.e., the identification information of the user) is used to identify the user. The number of jobs represents the number of print jobs stored in the job cache table T2 by the user. The latest access time represents the date and time of the latest access to a print job by the user.

FIGS. 8A and 8B illustrate an example of the job cache table T2 and the job cache stored therein. FIG. 8A illustrates parameter names in the job cache table T2, and FIG. 8B illustrates an example of actual values of parameters. The items of the job cache table T2 are similar to those of the print job illustrated in FIGS. 5A and 5B. However, the items of the job cache table T2 are not necessarily required to be similar to those of the print job, and may be different therefrom. For example, it suffices if the job cache table T2 includes information identifying the print job to be executed by the user (e.g., the document ID, the user name, or the job name).

The information stored in the job cache table T2 is referred to as the job cache. The job cache is the bibliographic information of the print job, as described above. The job cache table T2 is a conceptual table prepared for each user. It should be noted that there may be a situation in which there is a job cache table for a user A but there is no job cache table for a user B (e.g., the job cache table for the user B is not generated yet).

As for the user cache table T1, on the other hand, a single user cache table T1 constantly exists, and the capacity for storing the user caches of a predetermined number of users is secured for the user cache table T1. Alternatively, the user cache table T1 may be generated for each user similarly to the job cache table T2.

Figure 9:
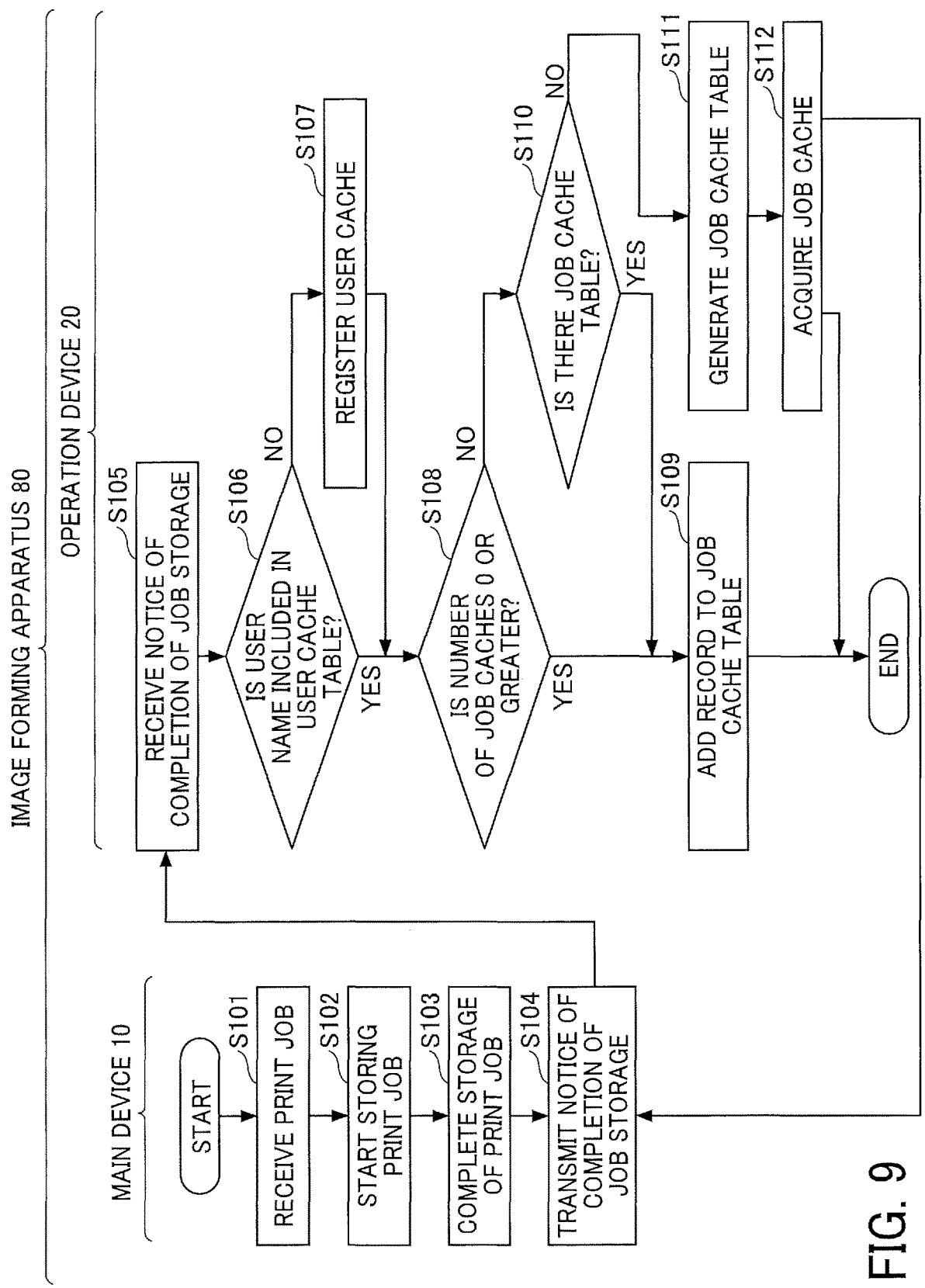
FIG. 9 is a flowchart illustrating an exemplary cache generation procedure according to the embodiment.

FIG. 9 is a flowchart illustrating an exemplary cache generation procedure. The procedure in FIG. 9 starts when a print job is transmitted to the image forming apparatus 80 from the client PC 70 with the printer driver, for example.

The print data transmitting and receiving unit 41 of the main device 10 first receives the print job (step S101). The print data analyzing unit 42, the print data creating unit 43, and the print job managing unit 44 of the main device 10 then start storing the print job, as described above (step S102).

The print job managing unit 44 completes the storage of the print job (step S103). That is, the print job managing unit 44 stores the image and the print settings in the print job information DB 49 such that the stored image and print settings are associated with each other.

After completing the storage of the print job, the print job managing unit 44 issues a notice of completion of the job storage to the cache generating unit 34 of the operation device via the information transmitting and receiving passage 48 (step S104). The notice includes the information stored in the user cache table T1 and the information stored in the job cache table T2. The cache generating unit 34 of the operation device 20 receives the notice (step S105).

The cache generating unit 34 determines whether the user name included in the notice is included in the user cache table T1 in the cache memory 35 (step S106).

If the user name included in the notice is not included in the user cache table T1 (NO at step S106), the cache generating unit 34 registers a user cache in the user cache table T1 to newly register the user corresponding to the user name (step S107). A maximum user number may be set for the user cache table T1 in consideration of the capacity of the cache memory 35.

If the user name included in the notice is included in the user cache table T1 (YES at step S106), the cache generating unit 34 checks the number of job caches of the user corresponding to the user name (step S108). The number of job caches is registered in the user cache table T1.

If the number of job caches of the user is zero or greater (YES at step S108), the cache generating unit 34 adds a record to the job cache table T2 (step S109). Herein, a record is the bibliographic information (i.e., job cache) of one print job. The cache generating unit 34 further updates the latest access time in the user cache table T1. The cache generating unit 34 thus stores a copy of at least a part of the print job in the cache memory 35 after the print job managing unit 44 stores the print job in the print job information DB 49.

When the number of job caches of the user is zero, one or more print jobs of the user are stored in the HDD 14, but there is no job cache registered in the job cache table T2. Specifically, the user name of the user is registered in the user cache table T1, but the number of jobs in the user cache table T1 is registered as 0. If the HDD 14 does not store a print job of the user, on the other hand, the user name of the user is not included in the user cache table T1, and the job cache table T2 for the user does not exist (it should be noted that the job cache table T2 for another user may exist in this case). When the number of job caches of a user is zero, therefore, it is understood that one or more print jobs of the user are stored in the HDD 14 but are not cached. In other words, when the number of job caches of a user is zero, one or more print jobs of the user are stored in the HDD 14. Further, when the job cache table T2 for the user does not exist, the HDD 14 does not store a print job of the user.

If the number of job caches of the user is not zero or greater (NO at step S108), the cache generating unit 34 determines whether the job cache table T2 for the user exists, i.e., whether the job cache table T2 including the user name of the user exists (step S110). If the result of step S108 is NO, the job cache table T2 for the user normally does not exist.

If the job cache table T2 for the user exists (YES at step S110), the procedure proceeds to step S109, at which the cache generating unit 34 adds a job cache to the job cache table T2 for the user (step S109).

If the job cache table T2 for the user does not exist (NO at step S110), the cache generating unit 34 generates the job cache table T2 for the user (step S111).

After generating the job cache table T2, the cache generating unit 34 requests the main device 10 to transmit any job cache to be added to the job cache table T2, and acquires the job cache (step S112). This is because there is a possibility that, as well as the print job of the user received at step S101, another print job of the user has already been stored in the print job information DB 49. That is, in the embodiment, print jobs are controlled such that all or none of the print jobs of the same user is cached in the job cache table T2. With this control, the print jobs of the same user are prevented from being partially cached in the cache memory 35, i.e., partially displayed on the operation panel 27.

With the above-described processes, the user cache table T1 and the job cache table T2 are updated. Specific examples of updating the user cache table T1 and the job cache table T2 will be described in detail later with FIGS. 14A to 26C.

Each of the user cache table T1 and the job cache table T2 is updated when a print job is deleted or when a scheduled process of the application is performed. The cache memory 35 is cleared when the image forming apparatus 80 is powered off.

A job list display process of the embodiment will be described.

For comparison purposes, a description will first be given of a related-art job list display process performed when the bibliographic information of the print job is not cached.

Figure 10:
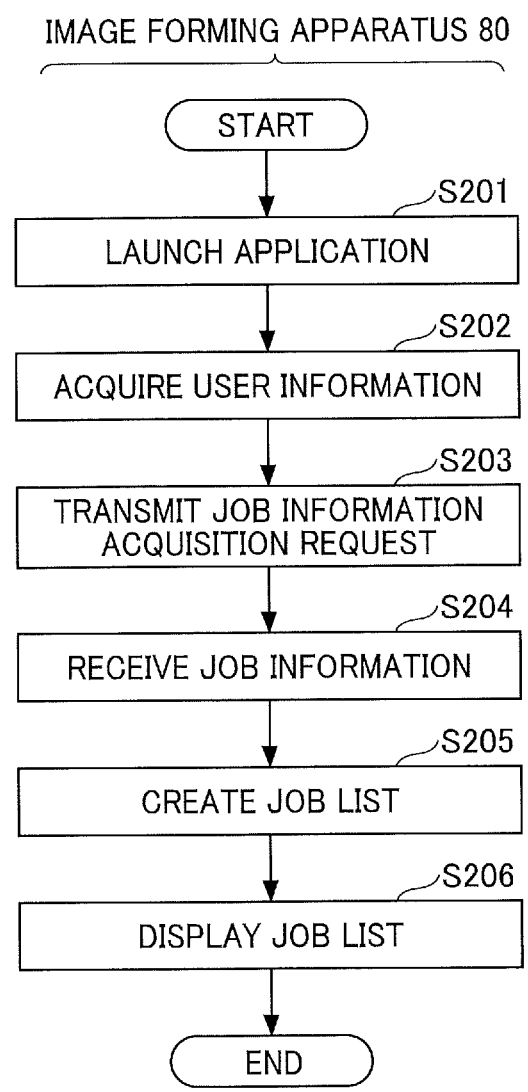
FIG. 10 is a flowchart illustrating an exemplary print job list display procedure according to related art performed by the image forming apparatus when bibliographic information of the print job is not cached.

FIG. 10 is a flowchart illustrating an example of a related-art procedure of displaying the job list of print jobs performed by the image forming apparatus 80 when the bibliographic information of the print jobs is not cached. It is assumed here that the user has logged in to the image forming apparatus 80.

The logged-in user first operates the operation device 20 to launch the application software for executing the printing of a stored print job. The operation receiving unit 31 receives the operation of launching the application software, and launches the application software (step S201).

The data processing unit 32 acquires the user name of the logged-in user from a secure area that stores the use authority, for example (step S202), and transmits a job information acquisition request to the main device 10 together with the user name (step S203).

The print job providing unit 46 of the main device 10 searches through the print job information DB 49 for the print jobs corresponding to the user name, and transmits, in a batch, all bibliographic information of the print jobs corresponding to the same user name to the data processing unit 32. The data processing unit 32 receives at least the bibliographic information of the print jobs (step S204).

The display processing unit 33 creates a job list for displaying the bibliographic information from the print jobs (step S205), and displays the job list of the print jobs on the operation panel 27 (step S206).

According to the above-described configuration, when the image forming apparatus 80 before user login is in the energy saving state or in the power-off state, in which the HDD 14 is stopped, it takes time for the data processing unit 32 to receive the bibliographic information of the print jobs.

A description will now be given of a job list display process of the embodiment performed when the bibliographic information of the print jobs is cached.

Figure 11:
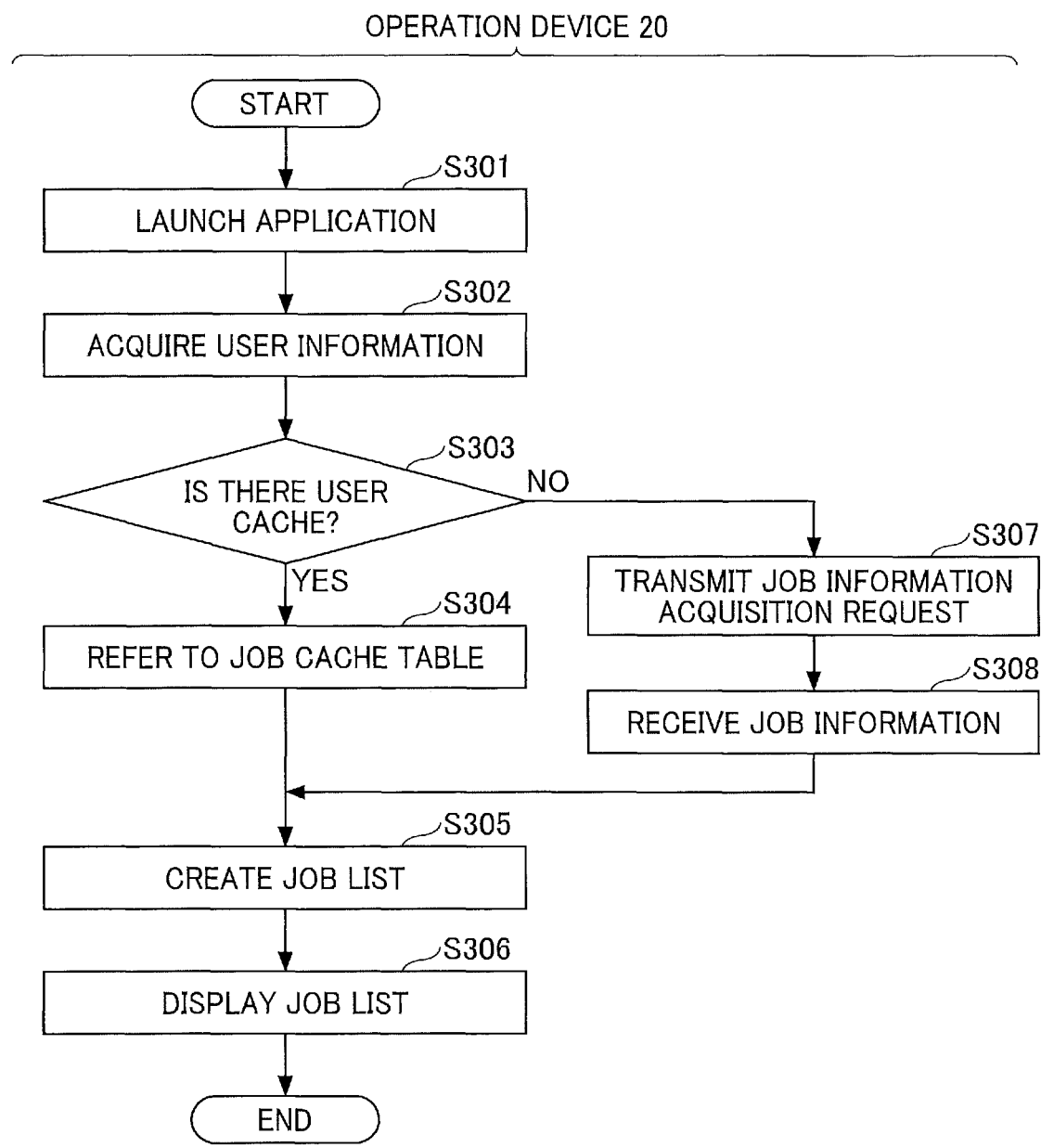
FIG. 11 is a flowchart illustrating an exemplary print job list display procedure according to the embodiment performed by the image forming apparatus when bibliographic information of the print job is cached.

FIG. 11 is a flowchart illustrating an example of a procedure of displaying the job list of print jobs performed by the image forming apparatus 80 when the bibliographic information of the print jobs is cached. The following description of the procedure illustrated in FIG. 11 will focus on differences from the procedure illustrated in FIG. 10.

Steps S301 and S302 in FIG. 11 may be similar to steps S201 and S202 in FIG. 10. At step S303, the data processing unit 32 determines whether there is a user cache (step S303) before acquiring the bibliographic information of the print jobs from the HDD 14. That is, the data processing unit 32 determines whether the user name acquired at step S302 is registered in the user cache table T1.

If the user name acquired at step S302 is not included in the user cache table T1 (NO at step S303), the data processing unit 32 transmits the job information acquisition request to the main device 10 together with the user name, similarly as in the procedure illustrated in FIG. 10 (step S307). The data processing unit 32 then receives the print jobs (step S308).

If the user name acquired at step S302 is included in the user cache table T1 (YES at step S303), the data processing unit 32 refers to the corresponding job cache table T2 (step S304). If one or more job caches are registered in the job cache table T2, the data processing unit 32 acquires the one or more job caches from the job cache table T2.

There may be a case in which the user name is included in the user cache table T1 but the number of job caches corresponding to the user name is zero. For example, information may be stored which indicates that there is no copy of the information of at least a part of a print job associated with the identification information of the logged-in user. In this case, too, the data processing unit 32 performs steps S307 and 308 to receive the print job(s) from the main device 10. The number of job caches being zero indicates that the HDD 14 stores one or more print jobs, making it possible to display a message such as "Print job information is being retrieved," for example. If whether the HDD 14 stores a print job is unknown, the operation device 20 may make inquiry about the presence or absence of a print job in the HDD 14 and end up finding no print job in the HDD 14. Such a situation increases the waiting time for user, consequently degrading usability.

Steps S305 and S306 in FIG. 11 may be similar to steps S205 and S206 in FIG. 10.

According to the procedure illustrated in FIG. 11, even when the image forming apparatus 80 before user login is returning from the energy saving state or the power-off state (i.e., the state in which the HDD 14 is stopped) and thus the HDD 14 is inaccessible, it is possible to display the bibliographic information with no need to access to the HDD 14 of the main device 10, if the job caches are registered in the job cache table T2. The procedure in FIG. 11 therefore reduces the time taken to display the job list. Consequently, the waiting time for the user is reduced, improving operability.

An exemplary job list screen will be described.

Figure 12:
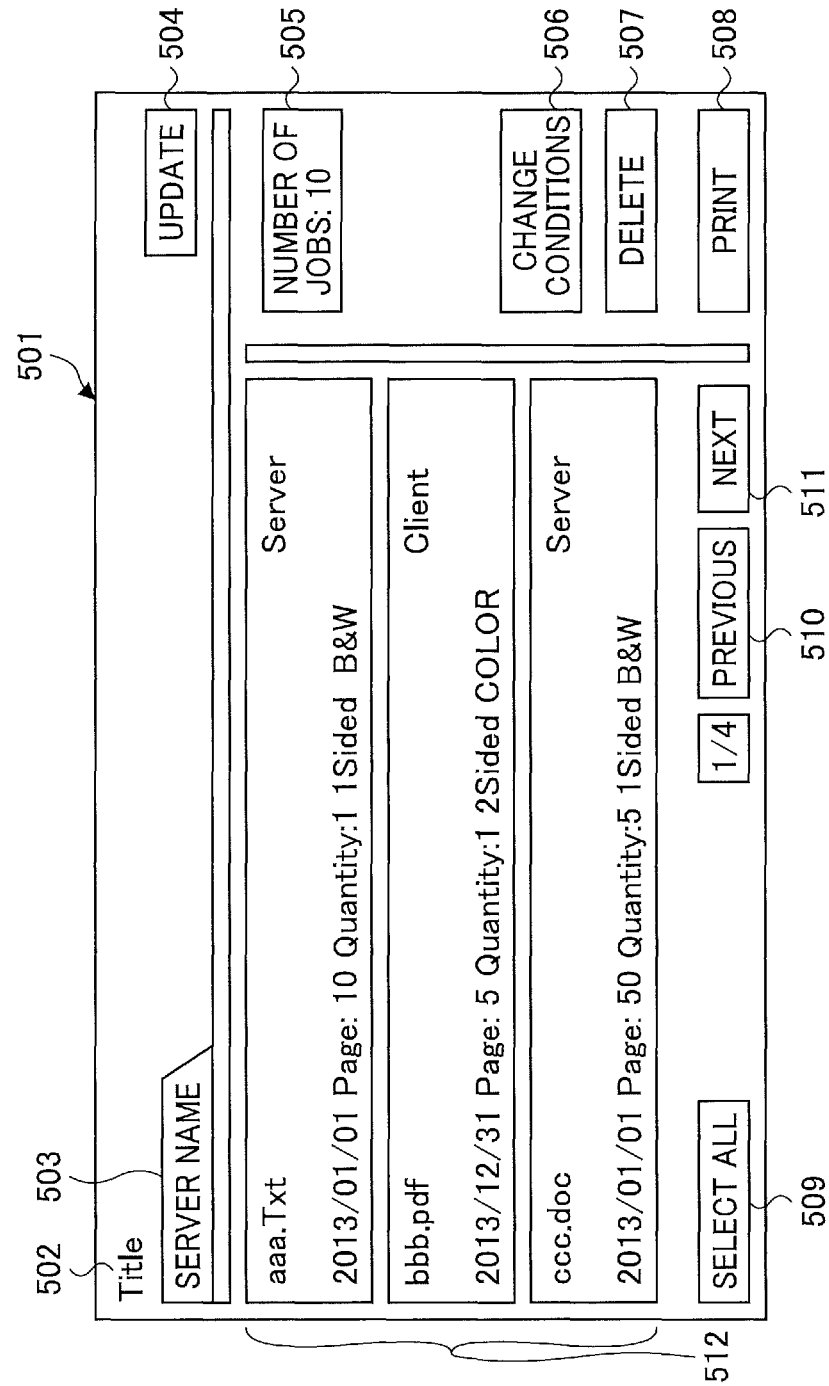
FIG. 12 is a diagram illustrating an exemplary job list screen according to the embodiment displayed on an operation panel of the image forming apparatus by a data processing unit of the image forming apparatus.

FIG. 12 is a diagram illustrating an exemplary job list screen displayed on the operation panel 27 by the data processing unit 32. A job list screen 501 displays the bibliographic information of each print job. The format of the job list screen 501 is unchanged whether or not the bibliographic information of the print job is cached.

The job list screen 501 includes a title field 502, a server name label 503, an update button 504, a job count display field 505, a change conditions button 506, a delete button 507, a print button 508, a select all button 509, a previous button 510, a next button 511, and a print job display field 512.

The title filed 502 displays information of displayed print jobs, such as the user name, for example. When the print jobs are acquired from the print server 30, the server name label 503 displays the print server name. The update button 504 is used to update the job list screen 501. The job count display field 505 displays the number of print jobs stored by the user (i.e., the number of jobs to be displayed).

The change conditions button 506 is used to change the print settings in the job storage. The delete button 507 is used to delete the print job selected by the user. The print button 508 is used to print the print job selected by the user.

The select all button 509 is used to select all print jobs being displayed. The next button 511 is used to display any print job not displayed yet on the job list screen 501. The previous button 510 is used to return to the print jobs previously displayed on the job list screen 501.

The print job display field 512 displays, for each print job, information such as the job name, the date of execution of the storage process, the number of pages, the quantity, the side setting (e.g., one-sided or two-sided), the color information (e.g., black and white), and the storage location of the print job (e.g., the image forming apparatus 80 or the print server 30).

The job list screen 501 enables the user to obtain a desired print job when desired. Further, with the login process, the confidentiality of the print jobs stored by the user is maintained.

FIG. 13 is a diagram illustrating an example of an in-progress screen 521 displayed on the operation panel 27 during the execution of the print job. The in-progress screen 521 is displayed when the print button 508 in FIG. 12 is pressed. The in-progress screen 521 displays the job name, the storage date and time, and the number of pages of the print job currently undergoing printing, thereby allowing the user to check the progress of his or her print job.

The user cache table T1 and the job cache table T2 will be described. Specifically, a detailed description will be given below of how the respective states of the user cache table T1 and the job cache table T2 are changed by operations such as registration and deletion of a print job.

FIGS. 14A and 14B illustrate exemplary respective states of the user cache table T1 and the job cache table T2. FIG. 14A illustrates the user cache table T1, and FIG. 14B illustrates the job cache table T2. For convenience of description, it is assumed in FIGS. 14A to 26C that the upper limit of the user cache table T1 is four user caches, and that the upper limit of the job cache table T2 is ten job caches. In the user cache table T1, an uppercase alphabetical letter represents the user name, indicating that there is a user cache of the user corresponding to the user name. In the user cache table T1 in FIG. 14A, "A" indicates that there is a user cache of the user A. Further, a broken-line field represents an open field in the user cache table T1.

In the job cache table T2, an uppercase alphabetical letter represents the user name, and the parenthesized number following the uppercase alphabetical letter represents the number of job caches registered in the job cache table T2. The parenthesized number being 0 indicates that there is no job cache registered in the job cache table T2, but that the HDD 14 stores one or more print jobs. In the job cache table T2 in FIG. 14B, "A(5)" indicates that there are five job caches of the user A, and "B(0)" indicates that there is no job cache of the user B but that the HDD 14 stores one or more print jobs of the user B. Further, a broken-line field represents an open field for the job cache table T2.

A description will be given of the respective states of the user cache table T1 and the job cache table T2 in the initial launch of the application.

The initial launch of the application refers to launching the application software in the state in which the cache memory 35 is cleared after the completion of the last session of the application software, such as launching the application software when the image forming apparatus 80 in the power-off state is powered on, for example.

FIGS. 15A to 15C illustrate the job storage state and the respective states of the user cache table T1 and the job cache table T2 when the print jobs in the HDD 14 are within the respective upper limits of the user cache table T1 and the job cache table T2. FIG. 15A illustrates the print job storage state in the HDD 14. FIG. 15B illustrates the user cache table T1 and the job cache table T2 before the launch of the application. Since the application is initially launched in this case, all fields in the user cache table T1 and the job cache table T2 are open.

FIG. 15C illustrates the user cache table T1 and the job cache table T2 after the launch of the application. User names A, B, and C are registered in the user cache table T1, and the job caches (e.g., bibliographic information) of the print jobs corresponding to the user names A, B, and C are registered in the job cache table T2. The user names A, B, and C are registered in the user cache table T1 in order of latest access time. Thereafter, respective records associated with the user names A, B, and C are created in the job cache table T2.

FIGS. 16A to 16C illustrate the job storage state and the respective states of the user cache table T1 and the job cache table T2 when the print jobs in the HDD 14 exceed the upper limit of the user cache table T1. The layout in FIG. 16A is similar to that in FIG. 15A, but the print job storage state in FIG. 16A is different from that in FIG. 15A. The user cache table T1 and the job cache table T2 before the launch of the application illustrated in FIG. 16B are similar to those in FIG. 15B.

FIG. 16C illustrates the user cache table T1 and the job cache table T2 after the launch of the application. Since the upper limit of the user cache table T1 is four user caches, the user cache of a user E, whose latest access time is fifth, is not registered in the user cache table T1. Consequently, the job cache table T2 for the user E is not created.

FIGS. 17A to 17C illustrate the job storage state and the respective states of the user cache table T1 and the job cache table T2 when the print jobs in the HDD 14 exceed the upper limit of the job cache table T2. The layout in FIG. 17A is similar to that in FIG. 15A, but the print job storage state in FIG. 17A is different from that in FIG. 15A. The user cache table T1 and the job cache table T2 before the launch of the application illustrated in FIG. 17B are similar to those in FIG. 15B.

FIG. 17C illustrates the user cache table T1 and the job cache table T2 after the launch of the application. The job cache table T2 is created in order of latest user access time such that the job caches to be registered in the job cache table T2 will not exceed the upper limit of ten job caches. In this example, if the job caches of the print jobs of the user C are registered in the job cache table T2, the total number of job caches registered therein exceeds the upper limit of ten job caches. Therefore, the job cache table T2 is created for each of the users C and D, but "0" is registered as the number of job caches for each of the users C and D. With "0" registered as the number of job caches of each of the users C and D, it is understood that the HDD 14 stores print jobs of the users C and D.

In the initial launch of the application, the job caches are thus created from the print jobs in the HDD 14 and stored in the cache memory 35. Even when the image forming apparatus 80 is transitioning from the power-off state to the power-on state, therefore, the users are able to use the job caches.

A description will be given of the respective states of the user cache table T1 and the job cache table T2 in the job storage.

The job storage refers to the storage of a print job into the HDD 14 by a user when the user cache table T1 and the job cache table T2 are already being managed by the application software. In the job storage, addition of a user cache to the user cache table T1 and addition and deletion of a job cache to and from the job cache table T2 take place.

Figure 18A:
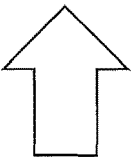
FIGS. 18A to 18C are diagrams illustrating an exemplary job storage state and exemplary respective states of the user cache table and the job cache table according to the embodiment when a print job is added by a new user and the print jobs in the HDD are within the upper limits of the user cache table and the job cache table.
Figure 18C:
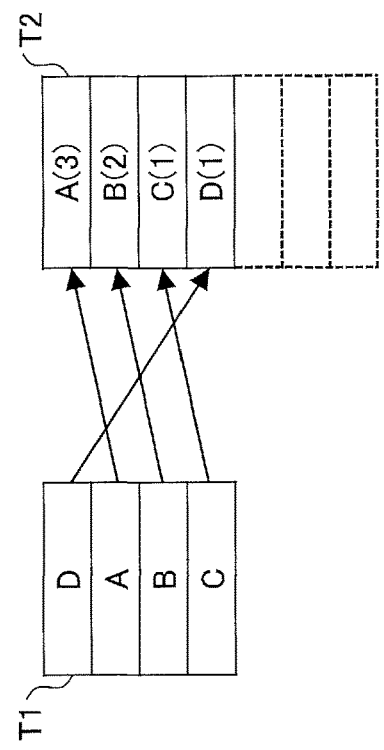
Figure 18B:
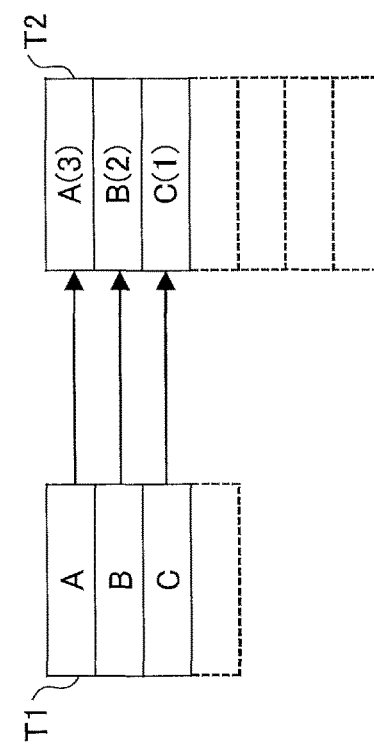

FIGS. 18A to 18C illustrate the job storage state and the respective states of the user cache table T1 and the job cache table T2 when a print job is stored by a new user and the print jobs in the HDD 14 are within the respective upper limits of the user cache table T1 and the job cache table T2. FIG. 18A illustrates the print job storage state before the storage of the print job into the HDD 14 and the print job storage state after the storage of the print job into the HDD 14. FIG. 18B illustrates the user cache table T1 and the job cache table T2 before the storage of the additional print job. FIG. 18C illustrates the user cache table T1 and the job cache table T2 after the storage of the additional print job.

Since the user D newly stores a print job in the HDD 14, the user cache of the user D is added to the user cache table T1. When user cache of the user D is added to the user cache table T1, the user caches in the user cache table T1 are rearranged in order of latest access time. Even if the job cache of the user D is registered in the job cache table T2, the total number of registered job caches does not exceed the upper limit of the job cache table T2. Therefore, the job cache table T2 for the user D is generated.

Figure 19A:
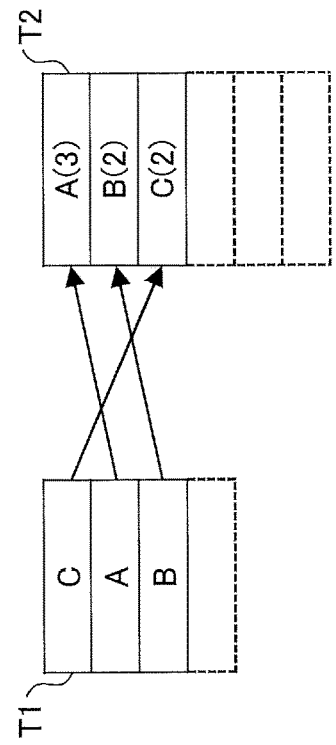
FIGS. 19A to 19C are diagrams illustrating an exemplary job storage state and exemplary respective states of the user cache table and the job cache table according to the embodiment when a print job is added by an existing user and the print jobs in the HDD are within the upper limits of the user cache table and the job cache table.
Figure 19B:
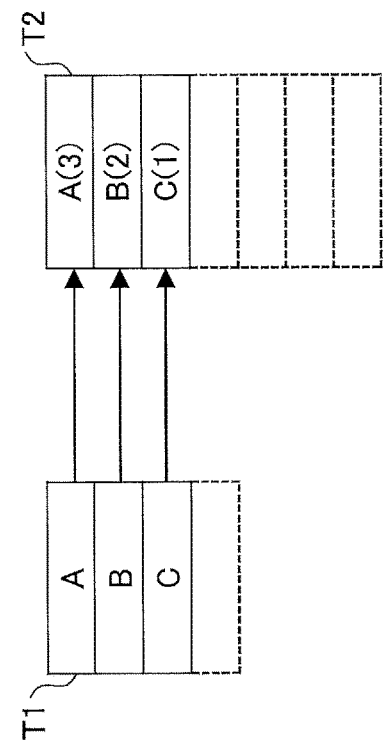
Figure 19C:
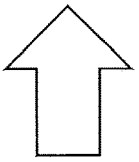

FIGS. 19A to 19C illustrate the job storage state and the respective states of the user cache table T1 and the job cache table T2 when a print job is stored by an existing user and the print jobs in the HDD 14 are within the respective upper limits of the user cache table T1 and the job cache table T2. FIG. 19A illustrates the print job storage state before the storage of the print job into the HDD 14 and the print job storage state after the storage of the print job into the HDD 14. FIG. 19B illustrates the user cache table T1 and the job cache table T2 before the storage of the print job. FIG. 19C illustrates the user cache table T1 and the job cache table T2 after the storage of the print job.

Since the existing user C stores a print job in the HDD 14, the user caches in the user cache table T1 are rearranged in order of latest access time, and a job cache is added to the job cache table T2 for the user C.

FIGS. 20A to 20C illustrate the job storage state and the respective states of the user cache table T1 and the job cache table T2 when a print job is stored by a new user in the state in which the user cache table T1 has reached the upper limit thereof. FIG. 20A illustrates the print job storage state before the storage of the print job into the HDD 14 and the print job storage state after the storage of the print job into the HDD 14. FIG. 20B illustrates the user cache table T1 and the job cache table T2 before the storage of the print job. FIG. 20C illustrates the user cache table T1 and the job cache table T2 after the storage of the print job.

Although a user E newly stores a print job in the HDD 14, the user cache of the user E is not added to the user cache table T1 since the user cache table T1 has reached the upper limit thereof. Consequently, the job cache table T2 for the user E is not generated. To obtain the bibliographic information of his or her print job, therefore, the user E accesses the HDD 14.

Figure 21A:
FIGS. 21A to 21C are diagrams illustrating an exemplary job storage state and exemplary respective states of the user cache table and the job cache table according to the embodiment when a print job is added by an existing user in the state in which the user cache table has reached the upper limit thereof.
Figure 21C:
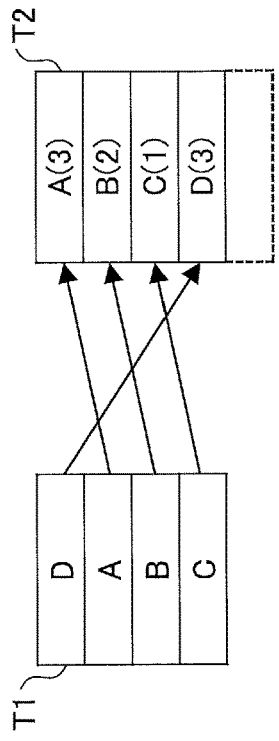
Figure 21B:
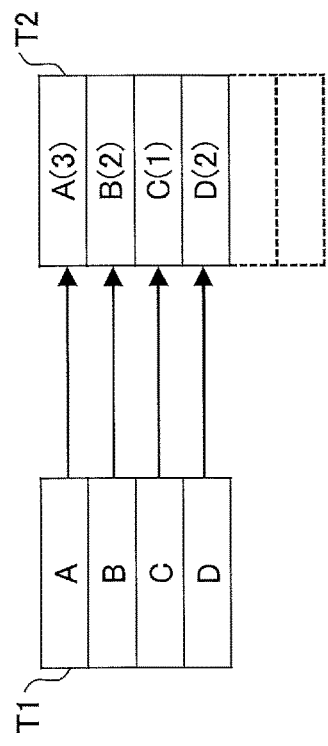

FIGS. 21A to 21C illustrate the job storage state and the respective states of the user cache table T1 and the job cache table T2 when a print job is stored by an existing user in the state in which the user cache table T1 has reached the upper limit thereof. FIG. 21A illustrates the print job storage state before the storage of the print job into the HDD 14 and the print job storage state after the storage of the print job into the HDD 14. FIG. 21B illustrates the user cache table T1 and the job cache table T2 before the storage of the print job. FIG. 21C illustrates the user cache table T1 and the job cache table T2 after the storage of the print job.

Since the user D newly stores a print job in the HDD 14, the user caches in the user cache table T1 are rearranged in order of latest access time, and a job cache is added to the job cache table T2 for the user D. Specifically, all print jobs of the user D are acquired anew from the HDD 14 to reconstruct the job cache table T2.

FIGS. 22A to 22D illustrate the job storage state and the respective states of the user cache table T1 and the job cache table T2 when a print job is stored by an existing user in the state in which the job cache table T2 has reached the upper limit thereof. FIG. 22A illustrates the print job storage state before the storage of the print job into the HDD 14 and the print job storage state after the storage of the print job into the HDD 14. FIG. 22B illustrates the user cache table T1 and the job cache table T2 before the storage of the print job. FIG. 22C illustrates the user cache table T1 and the job cache table T2 after the storage of the print job and deletion of job caches. FIG. 22D illustrates the user cache table T1 and the job cache table T2 after the storage of the print job and addition of job caches.

Although the user D newly stores a print job in the HDD 14, the job cache table T2 is already full. As illustrated in FIG. 22C, therefore, the cache generating unit 34 updates the user caches by setting the number of job caches to zero for each of other users in order of oldest access time until the bibliographic information of all five print jobs of the user D is stored in the job cache table T2. In the example of FIG. 22C, the number of job caches is set to zero first for the user C and then for the user B.

Then, as illustrated in FIG. 22D, the cache generating unit 34 adds job caches to the job cache table T2 for the user D.

When a print job is added by a new user in the state in which the job cache table T2 has reached the upper limit thereof, a process similar to that in FIGS. 22A to 22D is performed, provided that the user cache table T1 has an open field. If the user cache table T1 has reached the upper limit thereof, a process similar to that in FIGS. 20A to 20C is performed.

A description will be given of the respective states of the user cache table T1 and the job cache table T2 in job deletion.

In the job deletion, deletion of the job cache table T2 and/or deletion of a job cache takes place. The job deletion is performed in response to a deleting operation by a user, settings for deleting the print job after printing, the scheduled process, or a deletion process by the management tool.

Figure 23A:
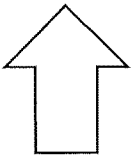
FIGS. 23A to 23C are diagrams illustrating an exemplary job storage state and exemplary respective states of the user cache table and the job cache table according to the embodiment when a print job is deleted by a user.
Figure 23C:
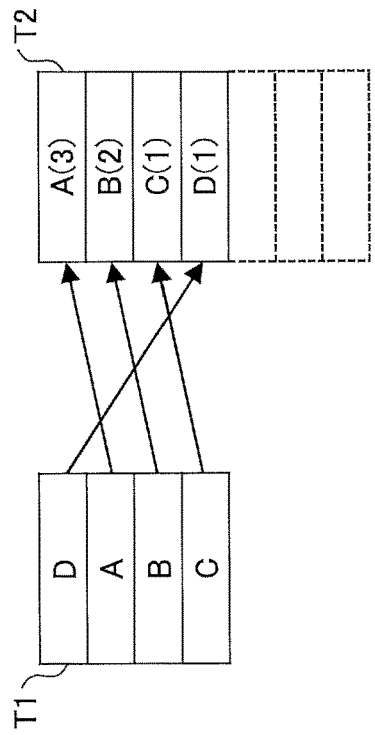
Figure 23B:
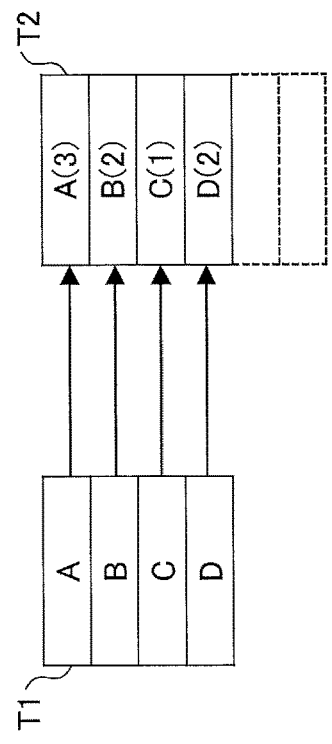

FIGS. 23A to 23C illustrate the job storage state and the respective states of the user cache table T1 and the job cache table T2 when one of the print jobs is deleted by a user. FIG. 23A illustrates the print job storage state before the deletion of the print job from the HDD 14 and the print job storage state after the deletion of the print job from the HDD 14. FIG. 23B illustrates the user cache table T1 and the job cache table T2 before the deletion of the print job. FIG. 23C illustrates the user cache table T1 and the job cache table T2 after the deletion of the print job.

Since one of the print jobs is deleted by the user D, the user caches in the user cache table T1 are rearranged in order of latest access time, and the corresponding job cache is deleted from the job cache table T2 for the user D. Consequently, an open field is created in the job cache table T2.

Figure 24A:
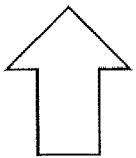
FIGS. 24A to 24C are diagrams illustrating an exemplary job storage state and exemplary respective states of the user cache table and the job cache table according to the embodiment when a print job is deleted by a scheduled process or a management tool.
Figure 24C:
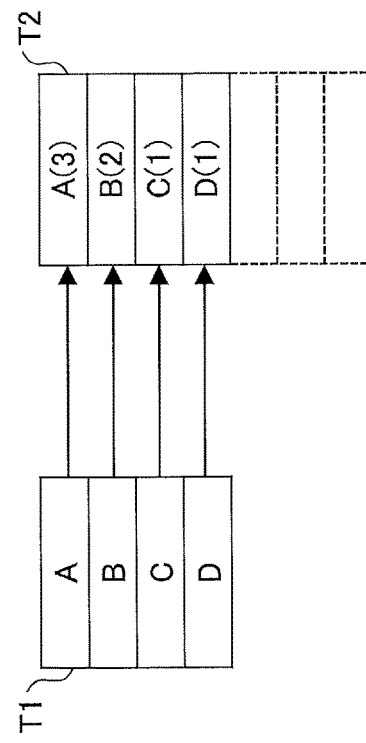
Figure 24B:
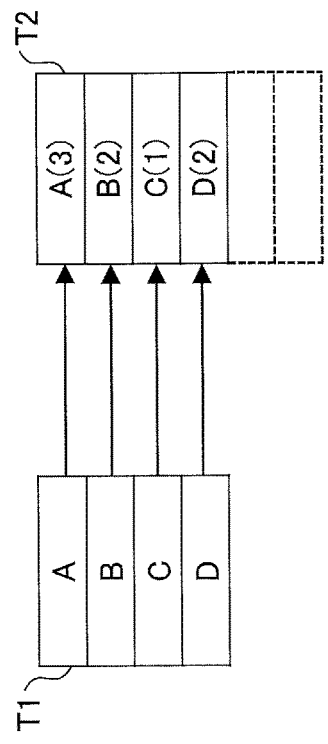

FIGS. 24A to 24C illustrate the job storage state and the respective states of the user cache table T1 and the job cache table T2 when one of the print jobs is deleted by the scheduled process or the management tool. FIG. 24A illustrates the print job storage state before the deletion of the print job from the HDD 14 and the print job storage state after the deletion of the print job from the HDD 14. FIG. 24B illustrates the user cache table T1 and the job cache table T2 before the deletion of the print job. FIG. 24C illustrates the user cache table T1 and the job cache table T2 after the deletion of the print job.

Since it is the scheduled process or the management tool that deletes one of the print jobs of the user D, the user cache table T1 is not updated, but the corresponding job cache is deleted from the job cache table T2 for the user D. Consequently, an open field is created in the job cache table T2.

FIGS. 25A to 25C illustrate the job storage state and the respective states of the user cache table T1 and the job cache table T2 when the number of print jobs of a user is reset to 0 by the deleting operation by the user or by the settings for deleting the print job after printing. FIG. 25A illustrates the print job storage state before the deletion of the print job from the HDD 14 and the print job storage state after the deletion of the print job from the HDD 14. FIG. 25B illustrates the user cache table T1 and the job cache table T2 before the deletion of the print job. FIG. 25C illustrates the user cache table T1 and the job cache table T2 after the deletion of the print job.

Since the number of print jobs of the user D is reset to 0, the user caches in the user cache table T1 are rearranged in order of latest access time. Further, since the print job of the user D is deleted from the HDD 14, the job cache table T2 for the user D is also deleted, creating an open job cache field.

As described above, when a print job stored in the HDD 14 is deleted, the job cache corresponding to the deleted print job is also deleted from the cache memory 35. Accordingly, the consistency between the data in the HDD 14 and the data in the cache memory 35 is maintained.

FIGS. 26A to 26C illustrate the job storage state and the respective states of the user cache table T1 and the job cache table T2 when the number of print jobs of a user is reset to 0 by the job deletion by the scheduled process or the management tool. FIG. 26A illustrates the print job storage state before the deletion of the print job from the HDD 14 and the print job storage state after the deletion of the print job from the HDD 14. FIG. 26B illustrates the user cache table T1 and the job cache table T2 before the deletion of the print job. FIG. 26C illustrates the user cache table T1 and the job cache table T2 after the deletion of the print job.

Since it is the scheduled process that deletes the print job of the user D, the user cache table T1 is not updated. Further, since the print job of the user D is deleted from the HDD 14, the job cache table T2 for the user D is also deleted, creating an open job cache field.

As described above, the image forming apparatus 80 of the embodiment creates the job cache in the cache memory 35 during the storage of the print job, and thus is capable of displaying the job list on the operation panel 27 even when the HDD 14 is inaccessible. Accordingly, the time taken to display the job list is reduced, thereby enabling a reduction in the waiting time for a user and thus improvement of operability.

For example, when an image forming apparatus is in the energy saving mode, in which an HDD of the image forming apparatus is stopped, the time taken for the HDD to become accessible is sometimes longer than the time taken for the application for print job execution to be launched. Consequently, there arises a situation in which the application software has been launched but the job list is not displayed, thereby keeping the user waiting, even though the waiting time is a relatively short time.

A similar phenomenon may occur when displaying the job list in other states in which the HDD is stopped, such as the power-off state of the image forming apparatus, as well as in the energy saving mode. Such a phenomenon may also occur when displaying a print job stored in a print server owing to delay in communication, for example, regardless of whether the HDD is stopped.

By contrast, the image forming apparatus 80 of the above-described embodiment creates the job cache in the cache memory 35 during the storage of the print job, thereby enabling the job list to be displayed on the operation panel 27 even when the HDD 14 is inaccessible.

In the image forming apparatus 80 of the embodiment, the main device 10 and the operation device 20 are separated from each other. For example, however, the main device 10 and the operation device 20 of the image forming apparatus 80 may not be separated from each other. For instance, the present invention is applicable to an image forming apparatus in which an HDD is stopped in the energy saving state but a RAM retains stored information even in the energy saving state.

Further, in the above-described embodiment, the image forming apparatus 80 caches the print jobs stored in the HDD 14. Alternatively, the image forming apparatus 80 may cache the print jobs stored in the print server 30. This configuration reduces the delay due to communication even if the HDD of the print server 30 is not stopped, thereby enabling a reduction in the waiting time for a user and thus improvement of operability.

Further, the image forming apparatus 80A may cache the print jobs stored in the HDD 14 of the image forming apparatus 80B. In this case, the image forming apparatus 80B caches the print jobs stored in the HDD 14 of the image forming apparatus 80A. This configuration enables the user to quickly access the job list regardless of which one of the image forming apparatuses 80 is operated by the user.

Further, although the image forming apparatus 80 displays the job list in the above-described embodiment, the present invention is also applicable to a projector that displays a list of videos, for example. The present invention is further applicable to digital signage that displays a list of content items, an electronic whiteboard that displays a list of page thumbnails, and a video conference terminal that displays a list of addresses.

Further, the blocks in the configuration examples in FIG. 4 and other drawings are divided in accordance with major functions of the image forming apparatus 80 for easier understanding of the processing of the image forming apparatus 80. The present invention is not limited by how the processing of the image forming apparatus 80 is divided into processing units or by the names of the processing units. Further, the processing of the image forming apparatus 80 may be divided into a larger number of processing units in accordance with the process. Further, one of the processing units may be subdivided to include a plurality of processes.

Further, the printing system 100 may include a plurality of print servers 30, or may include a plurality of servers that provide the function of the print server 30.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. One or more processors includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image forming apparatus comprising:
a first memory configured to store print job cache information transmitted from an information processing apparatus, with the print job cache information being associated with user cache information that includes identification information of a user corresponding to a print job; and
one or more processors configured to
in response to an operation performed by a logged-in user logged in to the image forming apparatus, determine whether the first memory stores the print job cache information associated with identification information of the logged-in user logged in to the image forming apparatus,
based on a result of the determination, acquire the print job cache information associated with the identification information of the logged-in user from the first memory, and
display the acquired print job cache information on a display of the image forming apparatus, wherein
the print job cache information includes only bibliographic information of the print job for a predetermined total number of jobs,
the user cache information includes the identification information of a plurality of users including the logged-in user, and the identification information of the plurality of users is registered in the user cache information in descending order of log-in time of the users, and
in a case where registration of jobs associated with the logged-in user would cause the total number of jobs to exceed the predetermined total number of jobs, the job cache information of the plurality of users is deleted in ascending order of log in time of the users until the total number of jobs, including the jobs of the logged-in user, is equal to below the predetermined total number of jobs.

2. The image forming apparatus of claim 1, further comprising a second memory configured to store the print job in association with the identification information of the user corresponding to the print job,
wherein the one or more processors store the print job in the second memory, and then stores the print job cache information in the first memory.

3. The image forming apparatus of claim 2, wherein when the image forming apparatus is operating in an energy-saving mode, the one or more processors acquire from the first memory the print job cache information associated with the identification information of the logged-in user, without accessing the second memory.

4. The image forming apparatus of claim 2, wherein when the result of the determination indicates that the print job cache information associated with the identification information of the logged-in user is absent in the first memory, the one or more processors acquire the print job stored in the second memory, and display information of the acquired print job on the display of the image forming apparatus.

5. The image forming apparatus of claim 2, wherein when the first memory stores information indicating the absence of the print job cache information associated with the identification information of the logged-in user, the one or more processors acquire from the second memory the print job cache information associated with the identification information of the logged-in user.

6. The image forming apparatus of claim 2, wherein when the print job stored in the second memory is deleted, the one or more processors delete the print job cache information stored in the first memory and corresponding to the deleted print job.

7. The image forming apparatus of claim 2, wherein the one or more processors store in the first memory a copy of information of each print job of a user stored in the second memory.

8. The image forming apparatus of claim 2, wherein the first memory is a volatile memory, and
wherein when the image forming apparatus shifts from a power-off state to a power-on state, the one or more processors generate the print job cache information from the print job stored in the second memory, and store the generated print job cache information in the first memory.

9. A printing system comprising:
an authentication server configured to authenticate a user;
a print server configured to store a print job; and
the image forming apparatus of claim 1.

10. A printing system comprising:
a print server configured to store a print job; and
an image forming apparatus configured to execute the print job, the image forming apparatus including
a first memory configured to store print job cache information in association with user cache information that includes identification information of a user corresponding to the print job, and
one or more processors configured to
in response to an operation performed by a logged-in user logged in to the image forming apparatus, determine whether the first memory stores the print job cache information associated with identification information of the logged-in user logged in to the image forming apparatus,
based on a result of the determination, acquire the print job cache information associated with the identification information of the logged-in user from the first memory, and
display the acquired print job cache information on a display of the mage forming apparatus, wherein
the print job cache information includes only bibliographic information of the print job for a predetermined total number of jobs,
the user cache information includes the identification information of a plurality of users including the logged-in user, and the identification information of the plurality of users is registered in the user cache information in descending order of log-in time of the users, and
in a case where registration of jobs associated with the logged-in user would cause the total number of jobs to exceed the predetermined total number of jobs, the job cache information of the plurality of users is deleted in ascending order of log in time of the users until the total number of jobs, including the jobs of the logged-in user, is equal to below the predetermined total number of jobs.

11. A job control method executed by an image forming apparatus, the job control method comprising:
storing print job cache information transmitted from an information processing apparatus into a first memory, with the print job cache information being associated with user cache information that includes identification information of a user corresponding to a print job;

in response to an operation performed by a logged-in user logged in to the image forming apparatus, determining whether the first memory stores the print job cache information associated with identification information of the logged-in user logged in to the image forming apparatus;

based on a result of the determination, acquiring the print job cache information associated with the identification information of the logged-in user from the first memory; and displaying the acquired print job cache information on a display of the image forming apparatus, wherein the print job cache information includes only bibliographic information of the print job for a predetermined total number of jobs, the user cache information includes the identification information of a plurality of users including the logged-in user, and the identification information of the plurality of users is registered in the user cache information in descending order of log-in time of the users, and in a case where registration of jobs associated with the logged-in user would cause the total number of jobs to exceed the predetermined total number of jobs, the job cache information of the plurality of users is deleted in ascending order of log in time of the users until the total number of jobs, including the jobs of the logged-in user, is equal to below the predetermined total number of jobs.

12. The image forming apparatus of claim 1, wherein the bibliographic information of the print job includes output setting information and at least one of document identification information, user identification information, job identification information, or job storage source identification information.

13. The printing system of claim 10, wherein the bibliographic information of the print job includes output setting information and at least one of document identification information, user identification information, job identification information, or job storage source identification information.

14. The job control method of claim 11, wherein the bibliographic information of the print job includes output setting information and at least one of document identification information, user identification information, job identification information, or job storage source identification information.

\* \* \* \* \*